United States Patent [19]

Otawa et al.

[11] Patent Number: 4,997,707
[45] Date of Patent: Mar. 5, 1991

[54] LAMINATED MOLDED ARTICLES AND PROCESSES FOR PREPARING SAME

[75] Inventors: Yasuhiko Otawa; Toshiyuki Maeda; Noboru Sakamaki; Tooru Takehara, all of Ichihara, Japan

[73] Assignee: Mitsui Petrochemical Industries, Ltd., Tokyo, Japan

[21] Appl. No.: 442,912

[22] Filed: Nov. 28, 1989

[30] Foreign Application Priority Data

Nov. 28, 1988 [JP] Japan ................. 63-300353
Feb. 15, 1989 [JP] Japan ................. 63-35449
Mar. 9, 1989 [JP] Japan ................. 63-56729

[51] Int. Cl.$^5$ ............... B32B 27/08; B32B 27/28; B32B 3/26
[52] U.S. Cl. ............... 428/319.3; 156/285; 428/319.7; 428/424.8; 428/476.9; 428/483
[58] Field of Search ............ 428/319.3, 319.7, 319.9, 428/424.8, 476.9, 483; 156/285

[56] References Cited

U.S. PATENT DOCUMENTS 4,183,435 1/1980 Thompson et al. ............ 428/319.7
4,316,934 2/1982 Maier et al. ............ 428/319.3
4,333,981 6/1982 Winfield et al. ............ 428/319.3

Primary Examiner—William J. Van Balen
Attorney, Agent, or Firm—Sherman and Shalloway

[57] ABSTRACT

In accordance with the present invention, there are provided laminated molded articles excellent in properties such as heat resistance, low-temperature resistance and the like and also excellent in soft touch and hand feel, said laminated molded articles comprising (a) a core layer composed of a synthetic resin,
(b) an interlayer (I) composed of a polyolefin foam, polyurethane foam or thermoplastic elastomer foam, formed on said core layer,
(c) an interlayer (II) composed of a modified polyolefin elastomer graft modified with at least one graft monomer selected from the group consisting of unsaturated carboxylic acids, derivatives thereof, unsaturated epoxy monomers and unsaturated hydroxy monomers, formed on said interlayer (I), and
(d) a surface skin composed of at least one polymer selected from the group consisting of polyamides, polyurethane and polyesters, formed on said interlayer (II), said surface skin being decorated, if necessary, by gigging the surface thereof.

11 Claims, 3 Drawing Sheets

LAMINATED MOLDED ARTICLES AND PROCESSES FOR PREPARING SAME

FIELD OF THE INVENTION

This invention relates to laminated molded articles, and processes for preparing the same and more particularly to soft laminated molded articles excellent in heat resistance, low-temperature resistance, oil resistance, solvent resistance, abrasion resistance and flaw resistance, and processes for preparing the same.

BACKGROUND OF THE INVENTION

Laminated molded articles prepared by laminating on a core layer composed of a synthetic resin a surface skin composed of other synthetic resin have heretofore been known as so-called solid laminated molded articles, the surface of which has been protected by a surface skin composed of a synthetic resin or has been made up or printed.

Such solid laminated molded articles as mentioned above may be prepared by preforming a synthetic resin sheet, wherein said sheet is attracted by vacuum forming to an inner wall surface of cavity of a mold for injection molding, and thereafter injection molding a synthetic resin in a fluid plasticized state into the cavity, and are widely used mainly for exterior and interior automotive trim, construction materials and the like.

These molded articles have such a merit that when a material having previously been decorated on the surface thereof with characters or patterns is used as a surface skin, there is no need for decorating the resulting solid molded articles with such characters or patterns after the formation thereof.

However, synthetic resin sheets or films conventionally used as surface skins are composed of resin materials such as polyvinyl chloride and the like, and hence these conventional surface skin materials had such drawbacks that they are poor in attraction at the time of vacuum forming, the molding thereof becomes more difficult with increasing complexity of share of the resulting solid molded article, cracks are formed at radiused corner portions thereof or creases are partly formed thereon. A further drawback of the conventional surface skins was that the transfer graining of the graining pattern of the inner wall surface of cavity of the mold to said skins is not always good. Still further, a polyvinyl chloride sheet or film used as a surface skin had sudh drawbacks that said sheet or film is poor in heat resistance, low-temperature resistance, oil resistance, solvent resistance, abrasion resistance and flaw resistance, and that because the plasticizer contained in said skin bleeds out therefrom, the resulting surface skins are poor to the touch when used as automotive interior trim.

OBJECT OF THE INVENTION

The present invention is intended to solve problems as mentioned above, and an object of the invention is to provide soft laminated molded articles excellent in heat resistance, low-temperature resistance, oil resistance, solvent resistance, abrasion resistance and flaw resistance, and processes for preparing the same.

In another aspect of the invention, a further object is to provide soft laminated molded articles excellent in the above-mentioned characteristics and having sharp graining patterns, and processes for preparing the same.

SUMMARY OF THE INVENTION

The first laminated molded article of the present invention is characterized by comprising:

(a) a core layer composed of a synthetic resin, (b) an interlaYer (I) formed on skid core layer, which is composed of a polyolefin foam, polyurethane foam or thermoplastic elastomer foam, (c) an interlayer (II) formed on said interlayer (I), which is composed of a modified polyolefin elastomer graft modified with at least one graft monomer selected from the group consisting of unsaturated carboxylic acids, derivatives thereof, unsaturated epoxy monomers and unsaturated hydroxy monomers, and (d) a surface skin formed on saic interlayer (II), which is composed of at least one polymer selected from the group consisting of polyamides, polyurethanes and polyesters.

The first process for preparing the laminated molded article of the present invention is characterized by obtaining the laminated molded article as described above through the steps in sequence of obtaining a preform having a cavity by preheating a three-layer sheet composed of the interlayer (I) composed of the aforesaid polyolefin foam, polyurethane foam or thermoplastic elastomer foam, the interlayer (II) composed of the aforesaid modified elastomer and the surface skin composed of the aforesaid polymer, and then applying said three-layer sheet by attraction closely to an inner wall surface of cavity of a mold for vacuum forming, obtaining a molded article having a concavity by clamping said preform in a state of being applied closely to the aforesaid inner wall surface of the mold for vacuum molding or in a state where said preform is applied closely to an inner wall surface of cavity of a separate mold for vacuum forming, and injection molding a synthetic resin in a fluid plasticized state into the cavity of said molded article being applied closely to the inner wall surface of the aforesaid mold.

The second process for preparing the laminated molded article of the invention is characterized by obtaining the laminated molded article through the steps in sequence of obtaining a preform having a cavity by preheating a three-layer sheet composed of the interlayer (I) composed of the aforesaid polyolefin foam, polyurethane foam or thermoplastic elastomer foam and the surface skin composed of the aforesaid polymer, and then applying said three-layer sheet by attraction closely to an inner wall surface of cavity of a mold for vacuum forming, and stamp molding a synthetic resin in a fluid plasticized state by casting said synthetic resin into the cavity of said preform being applied closely to the inner wall surface of cavity of the mold for vacuum forming or in a state where said preform is applied closely to an inner wall surface of cavity of a separate mold for vacuum forming.

Further, the third process for preparing the laminated molded article of the invention is characterized by preheating a four-layer sheet composed of the core layer composed of the aforesaid synthetic resin, the interlayer (I) composed of the aforesaid polyolefin foam, polyurethane foam or thermoplastic elastomer foam, the interlayer (II) composed of the aforesaid modified polyolefin elastomer and the surface skin composed of the aforesaid polymer, and then vacuum forming said four-layer sheet to obtain the laminated molded article.

The second laminated molded article of the invention is characterized by comprising (a) a core layer composed of a synthetic resin, (b) an interlayer (II) composed of a modified polyolefin elastomer graft-modified with at least one graft monomer selected from the group consisting of unsaturated carboxylic acids, derivatives thereof, unsaturated epoxy monomers and unsaturated hydroxy monomers, said interlayer (II) being formed on said core layer, and (c) a surface skin composed of at least one polymer selected from the group consisting of polyamides, polyurethanes and polyesters, said surface skin being formed on said interlayer (II).

The fourth process for preparing the laminated article of the invention is characterized by obtaining the laminated molded article through the steps in sequence of obtaining a preform having a concavity by preheating a two-layer sheet composed of the interlayer (II) composed of the aforesaid modified polyolefin elastomer and the surface skin composed of the aforesaid polymer, and then applying said two-layer sheet by attraction closely to an inner wall surface of cavity of a mold for vacuum forming, obtaining a molded article having a concavity by clamping said preform in a state of being applied closely to the inner wall surface of cavity of said mold for vacuum forming or in a state where said preform is applied closely to an inner wall surface of cavity of a separate mold for vacuum forming, and molding a synthetic resin in a fluid plasticized state by injecting said resin into the concavity of said molded article applied closely to the inner wall surface of said mold for vacuum forming.

The fifth process for preparing the laminated molded article of the invention is characterized by obtaining the laminated molded article through the steps in sequence of obtaining a preform having a concavity by preheating a two-layer sheet composed of the interlayer (II) composed of the aforesaid modified polyolefin elastomer and the surface skin composed of the aforesaid polymer, and then applying said two-layer sheet by attraction closely to an inner wall surface of cavity of a mold for vacuum forming, and stamp molding a synthetic resin in a fluid plasticized state by casting said resin into the concavity of said preform being applied closely to the inner wall surface of cavity of said mold for vacuum forming or the concavity of said preform being applied closely to an inner wall surface of cavity of a separate mold for vacuum forming.

Furthermore, the sixth process for preparing the laminated molded article of the invention is characterized by preheating a three-layer sheet composed of the core layer composed of the aforesaid synthetic resin, the interlayer (II) composed of the aforesaid modified polyolefin elastomer and the surface skin composed of the aforesaid polymer, and then vacuum forming said three-layer sheet to obtain the laminated molded article In the first and second laminated molded articles of the present invention, the surface skin composed of at least one polymer selected from the group consisting of polyamides, polyurethanes and polyesters and formed on the interlayer (II) may be decorated by gigging.

In the present specification, the term "sheet" is intended to designate also "film".

DETAILED DESCRIPTION OF THE INVENTION

Figure 1:
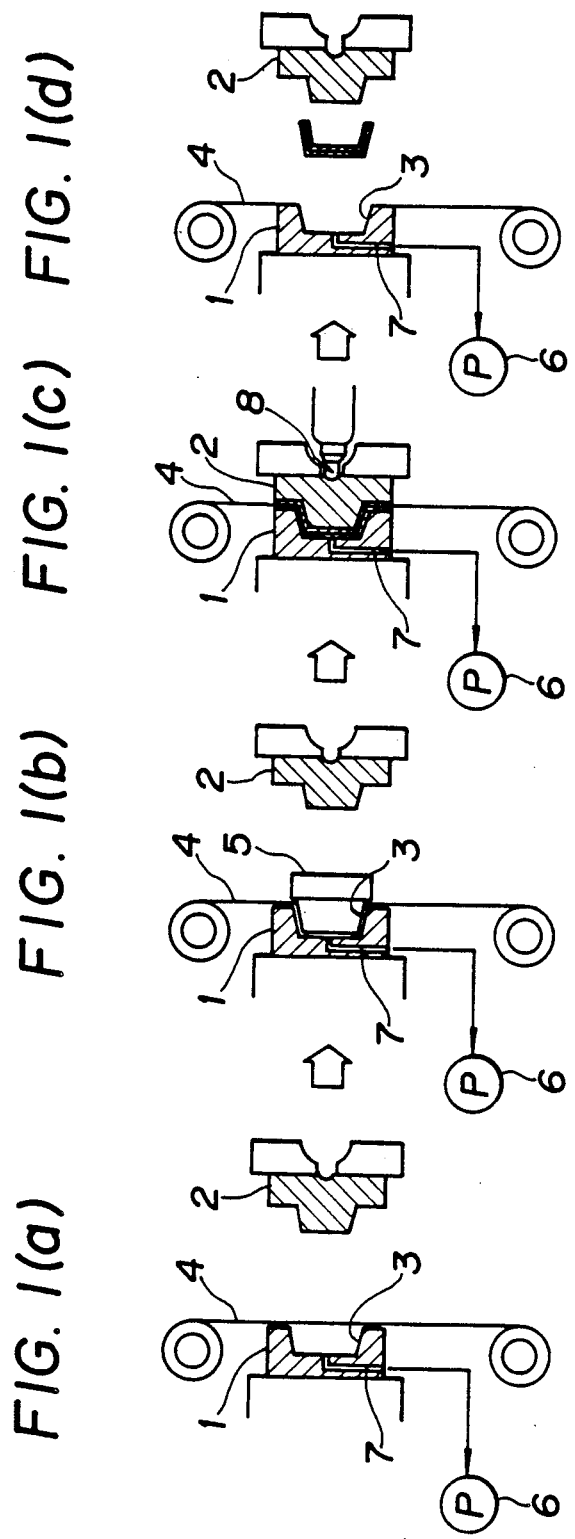
In FIG. 1, (a)–(d) are flow sheets of the processes for preparing the laminated molded articles of the present invention.

The laminated molded articles of the present invention and processes for preParing the same are illustrated below in detail with reference to the drawings.

The first laminated molded article of the invention is composed of the core layer composed of a synthetic resin, the interlayer (I) composed of a polyolefin foam, polyurethane foam or thermoplastic elastomer foam, the interlayer (II) composed of the modified polyolefin elastomer and the surface skin composed of a specific polymer.

Core Layer

The core layer used in the invention is composed of a synthetic resin, and this synthetic resin used preferably includes thermoplastic resins and thermoplastic elastomers.

The thermoplastic resins used above include concretely, irrespective of being crystalline or amorphous, polyolefins such as low density polyethylene, high density polyethylene, polypropylene, poly-1-butene and poly-4-methyl-1-pentene or random or block copolymers of $\alpha$-olefins such as ethylene, propylene, 1-butene and 4-methyl-1-pentene; ethylene/vinyl compounds copolymers such as ethylene/acrylic acid copolymers, ethylene/vinyl acetate copolymers, ethylene/vinyl alcohol copolymers and ethylene/vinyl chloride copolymers; styrene resins such as polystyrene, acrylonitrile/styrene copolymers, ABS, methyl methacrylate/styrene copolymers and $\alpha$-methylstyrene/styrene copolymers; polyvinyl compounds such as polyvinyl chloride, polyvinylidene chloride, vinyl chloride/vinylidene chloride copolymers, methyl polyacrylate and polymethyl methacrylate; polyamides such as nylon 6, nylon 6-6, nylon 6-10, nylon 11 and nylon 12; thermoplastic polyesters such as polyethylene terephthalate and polybutylene terephthalate; polycarbonate and polyphenylene oxide or mixtures thereof; or silicone resins and urethane resins.

The thermoplastic elastomer includes concretely modified polyolefin elastomers constituting the interlayer (II) as will be mentioned later, polyolefin elastomer, styrene elastomers, ester elastomers, urethane elastomers and vinyl chloride elastomer.

In the present invention, the synthetic resin used is selected suitably from those exemplified above with due consideration for the molding conditions, use, properties and price thereof. From the standpoint of physical properties of the resulting laminated molded articles such as impact resistance and weatherability, however, preferred are polyolefin resins, particularly polypropylene.

In the present invention, if necessary, the abovementioned synthetic resins used may be foamed with a foaming agent and may be incorporated with additives such as wood flour, segmented fiber, inorganic fillers, etc. in such a manner that they do not mar the desired physical properties of the resulting laminated molded articles or that they improve further said physical properties.

Interlayer (I)

The interlayer (I) used in the present invention is composed of a polyolefin foam, polyurethane foam or thermoplastic elastomer foam.

The above-mentioned polyolefin foam includes concretely polyethylene foam, polypropylene foam, a foam of a blend of polyethylene and polypropylene.

When the polyurethane foam is used as the interlayer (I), said polyurethane foam is preferably a soft polyurethane foam having a nearly continuous cell structure and has an extent of foaming of about 10-100 times, from the standpoint of flexibility, heat resistance and acoustic properties of the resulting laminated molded articles.

The thermoplastic elastomers constituting the thermoplastic elastomers foam used in the present invention are olefinic thermoplastic elastomers, for example, thermoplastic elastomers containing polyolefin resins and ethylene/α-olefin copolymer rubber as essential components.

The above-mentioned ethylene/α-olefin copolymer rubber preferably used in the present invention is a partially crosslinked product of ethylene/α-olefin copolymer rubber. However, a non-crosslinked product of ethylene/α-olefin copolymer rubber may also be used.

Preferred thermoplastic elastomers used in the invention include concretely thermoplastic resin compositions as will be mentioned below.

(I) Thermoplastic resin compositions obtained by mixing various polyolefin resins represented by a homopolymer of ethylene or propylene, or copolymers of the monomer and small amounts of other polymeric monomers, with partially crosslinked products of ethylene/α-olefin copolymer rubber such as bipolymers of ethylene and α-olefin of 3-14 carbon atoms or terpolymers or quaternary polymer rubber prepared by copolymerizing said bipolymers with various polyene compounds (see, for example, Japanese Pat. Publn. No. 21021/1978 and Japanese Pat. L-O-P Publn. No. 71738/1980).

(II) Thermoplastic resin compositions obtained by dynamically heat treating a blend of a polyolefin resin and an ethylene/α-olefin copolymer rubber in the presence of small amounts of crosslinker (see, for example, Japanese Pat. Publn. No. 34210/1978, Japanese L-O-P Publns. Nos. 49240/1978 and 149241/1978).

(III) Thermoplastic resin compositions obtained by blending the above-mentioned compositions (I) or (II) and polyolefin resins (see, for example, Japanese Pat. L-O-P Publns. Nos. 145857/1978 and 16554/1979).

(IV) Thermoplastic resin compositions obtained by dynamically heat treating in the presence of a small amount of peroxide a blend of peroxide crosslinking type polyolefin resins represented by homopolymer of ethylene or copolymers of ethylene with small amounts of other polymeric monomers, peroxide non-crosslinking type polyolefin resins represented by homopolymer of propylene or copolymers of propylene with small amounts of other polymeric monomers, and ethylene/α-olefin copolymer rubber (see, for example, Japanese Pat. L-O-P Publn No. 717/1980).

In the thermoplastic elastomers exemplified above, the polyolefin resin and ethylene/α-olefin copolymer rubber are used in a weight ratio of usually 90/10-10/90, preferably 80/20-20/80.

For the purpose of improving moldability and flaw resistance of the resulting sheet, there may be used as the polyolefin resin a mixture of polyethylene, particularly low density polyethylene, and polypropylene in a weight ratio of 10/90-70/30.

Mainly from the standpoint of strength of the resulting laminated molded articles, the ethylene/α-olefin copolymer rubber used is desirably an ethylene/α-olefin copolymer rubber in which the ethylene/α-olefin molar ratio is 50/50-90/10, preferably 70/30-85/15 and a Mooney viscosity $ML_{1+4}$ (121° C.) is at about 20, preferably about 40-80. When the ethylene/α-olefin copolymer rubber is partially crosslinked, it is preferable to dynamically heat treat 100 parts by weight of the thermoplastic elastomer and about 0.1-2 parts by weight of organic peroxide.

The above-mentioned thermoplastic resin composition used as the thermoplastic elastomers in the present invention may contain, if necessary, peroxide non-crosslinking type hydrocarbon rubbery substances represented by polyisobutylene, butyl rubber or the like and/or mineral oil softeners.

The thermoplastic elastomer foam used in the present invention is obtained usually by heating an unexpanded sheet of said thermoplastic elastomer.

The thermoplastic elastomers constituting the above-mentioned unexpanded sheet contain a foaming agent as an essential component.

The foaming agent used in the present invention includes concretely inorganic foaming agents such as sodium hydrogencarbonate, sodium carbonate, ammonium hydrogencarbonate, ammonium carbonate and ammonium nitrite; nitroso compounds such as N,N'-dimethyl-N,N'-dinitrosoterephthalamide and N,N'-dinitrosopentamethylenetetramine; azo compounds such as azodicarbonamide, azobisisobutyronitrile, azocyclohexylnitrile, azodiaminobenzene and barium azodicarboxylate; sulfonylhydrazide compounds such as benzenesulfonylhydrazide, toluenesulfonylhydrazide, p,p'-oxybis(benzenesulfonylhydrazide) and diphenylsulfone-3,3'-disulfonylhydrazide; and azide compounds such as calcium azide, 4,4'-diphenyldisulfonylazide and p-toluenesulfonylazide. Of these foaming agents, preferred is azodicarbonamide.

In the present invention, the proportion of the foaming agent contained in the unexpanded sheet of the thermoplastic elastomer is 0.1-50% by weight, preferably 0.5-20% by weight.

The above-mentioned unexpanded sheet of thermoplastic elastomer used in the present invention is formed usually by employing T-die extrusion, calender forming or the like forming technique.

The unexpanded sheet of thermoplastic elastomer used in the invention has a thickness usually of 0.05-5.0 mm, preferably 0.1-3.0 mm.

Subsequently, the thermoplastic elastomer foam is obtained by heating the above-mentioned unexpanded sheet of thermoplastic elastomer to expand. This heating is preferably conducted in an air oven, but other heating means may also be employed therefor The heating conditions employed above include the heating temperature of usually 160°-260°C., preferably 170°-250°C., and the heating time of 0.5-10 minutes, preferably 2-5 minutes.

In the present invention the extent of foaming of the above-mentioned unexpanded sheet is usually 1.1-20 times, preferably 1.2-5 times, and a thickness of the expanded sheet is usually 0.1-10 mm, preferably 0.2-5 mm.

When the above-mentioned thermoplastic elastomer foam is used as an interlayer, the resulting laminated molded article is sharp in shape and ridge and excellent in soft touch.

Interlayer (II)

The modified polyolefin elastomers constituting the interlayer (II) include concretely thermoplastic elastomers obtained by dynamically heat treating a blend in the presence of organic peroxides to partially crosslink the same, said blend containing (a) 100-10 parts by weight, preferably 95-10 parts by weight and particularly 95-60 parts by weight of peroxide crosslinking type olefin copolymer rubber, (b) 0-90 parts by weight, preferably 5-90 parts by weight and particularly 5-40 parts by weight of olefin plastics (the total amount of the component (a) and component (b) is 100 parts by weight), and (c) 0.01-10 parts by weight, preferably 0.1-5 parts by weight of at least one graft monomer selected from the group consisting of unsaturated carboxylic acids, derivatives thereof, unsaturated epoxy monomers and unsaturated hydroxy monomers.

The blend to be subjected to heat treatment mentioned above is desirably incorporated, in addition to the above mentioned components (a) through (c), based on 100 parts by weight of the total sum of said components (a) and (b), with (d) 0-100 parts, preferably 5-100 parts by weight and particularly 5-50 parts by weight of a peroxide non-crosslinking type rubbery substance and/or (e) 0-200 parts by weight, preferably 3-100 parts by weight and particularly 3-80 parts by weight of a mineral oil type softener, from the standpoint of improved moldability and workability of the resulting thermoplastic elastomer.

By incorporation into the blend of the component (a) in the amount as defined above, the resulting composition is found to be excellent in moldabilitY as well as in rubber-like properties such as rubber elasticity.

By incorporation into the blend of the components (b), (d) and (e) in the amount as defined above, the resulting composition is found to be excellent in rubber-like properties such as rubber elasticitY and, at the same time, in flowability and moldability.

By incorporation into the blend of the component (c) in the amount as defined above, the resulting composition is found to be excellent in moldability and thermal adhesion to resins or metals.

(a) Peroxide crosslinking type olefin copolymer rubber

The peroxide crosslinking type olefin copolymer rubber used in the present invention is an amorphous elastic copolymer consisting essentially of olefin, for example, as ethylene/propylene copolymer rubber, ethylene/propylene/non-conjugated diene rubber or ethylene/butadiene copolymer rubber which is crosslinked by mixing with an organic peroxide, followed by kneading with heating, whereby it decreases in flowability or does not flow. The conjugated diene as referred to above is intended to designate dicyclopentadiene, 1,4-hexadiene, dicyclooctadiene, methylenenorbornene, ethylidenenorbornene and the like.

Of the copolymer rubber of varied types as mentioned above, preferably used in the present invention are ethylene/propylene copolymer rubber and ethylene/propylene/non-conjugated diene rubber in which a molar ratio of ethylene unit/propylene unit (ethylene/propylene) is usually 50/50-90/10, preferably 55/45-85/15. Above all, preferred is ethylene/propylene/non-conjugated diene copolymer rubber, particularly ethylene/propylene/5-ethylidene-2-norbornene copolymer rubber and ethylene/propylene/5-ethylidene-2-norbornene/dicyclopentadiene quaternary polymer, from the standpoint that the thermoplastic elastomer compositions excellent in heat resistance, tensile strength and impact resilience are obtained.

The above-mentioned copolymer rubber preferably has a Mooney viscosity $ML_{1+4}$ (100° C.) of 10-250, particularly 40-150. By the use of such copolymer rubber as having the Mooney viscosity as defined above, the thermoplastic elastomer compositions excellent in tensile properties and flowability are obtained.

The above-mentioned copolymer rubber preferably has an iodine value (degree of unsaturation) of less than 25.

By the use of such copolymer rubber as having the iodine value defined above, the thermoplastic elastomer compositions excellent in balance between flowability and rubber-like properties are obtained.

(b) Olefin plastics

The olefin plastics used in the present invention are crystalline high molecular weight solid products obtained by high pressure or low pressure polymerization of one or two or more monoolefins. Such olefin plastics include, for example, isotactic and syndiotactic homopolymer or copolymer resins of monoolefins, and representatives of these resins are commercially available.

The starting olefins include, for example, ethylene, propylene, 1-butene, 1-pentene, 1-hexene, 2-methyl-1-propene, 3-methyl-1-pentene, 4-methyl-1-pentene, 5-methyl-1-hexene, 1-octene, 1-decene and mixtures of two or more. Polymerization of these olefins may be of random or block style if resinous products are obtained thereby.

Of the above-mentioned olefin plastics, preferred are peroxide-decomposition type olefin plastics and polyethylene.

The peroxide-decomposing type olefin plastics referred to above are such olefin plastics that they decompose to decrease in molecular weight when mixed with a peroxide and kneaded with heating, and increase in flowability of the resin. Such olefin plastics as mentioned above include, for example, isotactic polypropylene or copolymers of propylene and small amounts of other α-olefins, e.g., propylene/ethylene copolymers, propylene/1-butene copolymers, propylene/1-hexene copolymers and propylene/4-methyl-1-pentene copolymers. The olefin plastics to be mixed with the peroxide as aforesaid preferably have a melt index (ASTM-D-1238-65T, 230° C.) of 0.1-50, particularly 5-20. In the present invention, the olefin plastics used contribute to improvement in flowability and heat resistance of the resulting compositions.

(c) Unsaturated carboxylic acid or derivatives thereof, unsaturated epoxy monomers and unsaturated hydroxy monomers The unsaturated carboxylic acid or its derivative used in the present invention as one of the component (c) includes concretely, α,β-unsaturated carboxylic acids such as acrylic acid, methacrylic acid, maleic acid, fumaric acid, itaconic acid, citraconic acid and tetrahydrophthalic acid, unsaturated carboxylic acids such as bicyclo [2,2,1] hept-2-ene-5,6-dicarboxylic acid, anhydrides of α, β-unsaturated carboxylic acids such as maleic anhydride, itaconic anhydride, citraconic anhydride and tetrahydrophthalic anhydride, anhydrides of unsaturated carboxylic acids such as bicyclo[2,2,1]hept-2-ene-5,6-dicarboxylic acid anhydride, and esters of unsaturated carboxylic acids such as methyl acrylate, methyl methacrylate, dimethyl maleate, monomethyl maleate, diethyl fumarate, dimethyl itaconate, diethyl citraconate, dimethyl tetrahydrophthalic anhydride and dimethyl bicyclo[2,2,1]hept-2-ene-5,6-dicarboxylate. Of these carboxylic acid compounds, preferred are maleic acid and bicylo[2,2,1]hept-2-ene-5,6-dicarboxylic acid or anhydrides thereof.

The unsaturated epoxy monomer used as another component of the component (c) in the present invention includes concretely glycidyl esters of unsaturated monocarboxylic acids such as glycidyl acrylate, glycidyl methacrylate and glycidyl p-styrylcarboxylate; monoglycidyl esters or polyglycidyl esters of unsaturated polycarboxylic acids such as maleic acid, itaconic acid, citraconic acid, butenetricarboxylic acid, endo-cis-bicyclo[2,2,1]hept-5-ene-2,3-dicarboxylic acid and endo-cis-bicyclo[2,2,1]hept-5-ene-2-methyl-2,3-dicarboxylic acid; unsaturated glycidyl ethers such as allyl glycidyl ether, 2-methylallyl glycidyl ether, glycidyl ether of o-allylphenol, glycidyl ether of m-allylphenol, glycidyl ether of p-allylphenol, glycidyl ether of isopropenylphenol, glycidyl ether of o-vinylphenol, glycidyl ether of m-vinylphenol and glycidyl ether of p-vinylphenol; and 2-(o-vinylphenyl)ethylene oxide, 2-(p-vinylphenyl)ethylene oxide, 2-(o-vinylphenyl)propylene oxide, 2-(p-vinylphenyl)propylene oxide, 2-(o-allylphenyl)ethylene oxide, 2-(p-allylphenyl)ethylene oxide, 2-(o-allylphenyl)propylene oxide, 2-(p-allylphenyl)propylene oxide, p-glycidylstyrene, 3,4-epoxy-1-butene, 3,4-epoxy-3-methyl-1-butene, 3,4-epoxy-1-pentene, 3,4-epoxy-3-methyl-1-pentene, 5,6-epoxy-1hexene, vinylcyclohexene monoxide and allyl-2,3-epoxycyclopentyl ether.

The unsaturated hydroxy monomer used as another one of the component (c) in the present invention is a monomer having at least one ethylenically unsaturated bond and at least one hydroxy group, and includes concretely hydroxyethyl acrylate, hydroxypropyl acrylate, hydroxyethyl methacrylate, hydroxypropyl methacrylate, polyethylene glycol monomethacrylate, polypropylene glycol monomethacrylate and the like, and particularly preferred are hydroxyethyl (meth)acrylate and hydroxypropyl (meth)acrylate.

The component (c) as illustrated above act as graft modifiers at the time of dynamical heat treatment as will be mentioned later, and have a role to strengthen the interfacial adhesion between the surface skin composed of polyamide, polyurethane or polyester and the interlayer (II) composed of a modified polyolefin elastomer.

(d) Peroxide non-crosslinking type rubbery substances

The peroxide non-crosslinking type rubbery substances, the above-mentioned component (d), are hydrocarbon type rubbery substances such as polyisobutylene, butyl rubber (IIR), propylene/ethylene copolymer rubber containing at least 70 mol% of propylene and atactic polypropylene which do not crosslink and do not decrease in flowability even when mixed with a peroxide and kneaded with heating. Of these rubbery substances, most preferred are polyisobutylene and butyl rubber (IIR) from the standpoint of performance and handling.

The peroxide non-crosslinking type rubbery substances improve the thermoplastic elastomer compositions in flowability, and said rubbery substances are preferably those having a Mooney viscosity of up to 60 in particular.

(e) Mineral oil type softeners

The mineral oil type softeners (e) are high boiling paraffinic, naphthenic or aromatic petroleum fractions which are usually used at the time of rolling rubber with the purposes of weakening intermolecular force of rubber to facilitate processing and, at the same time, aiding dispersion of the fillers to be incorporated such as carbon black and white carbon, or of reducing the hardness of vulcanized rubber to increase flexibility and elasticity.

Preparation of modified polyolefin elastomers

The modified polyolefin elastomers constituting the interlayer (II) in the laminated molded articles of the present invention may be prepared by preparing a blend of the aforesaid components (a) through (c) and, if necessary, the component (d) and/or (e) according to the aforementioned weight proportions, and dynamically heat treating said blend in the presence of an organic peroxide to partially crosslink the heat treated blend.

The modified polyolefin thermoplastic elastomers may be incorporated with fibrous fillers, polyolefin plastics, or fillers, for example, glass fiber, potassium titanate fiber, high density polyethylene, medium density polyethylene, low density polyethylene, isotactic polypropylene, propylene/α-olefin copolymer, calcium carbonate, calcium silicate, clay, kaolin, talc, silica, diatomaceous earth, mica powder, asbestos, alumina, barium sulfate, aluminum sulfate, calcium sulfate, basic magnesium carbonate, molybdenum disulfide, graphite, glass fiber, glass beads, silas balloon, carbon fiber, etc., and colorants, for example, carbon black, titanium oxide, zinc white, red oxide, ultramarine, iron blue, azo pigments, nitroso pigments, lake pigments, phthalocyanine pigments and the like.

In the present invention, there may be used known heat stabilizers such as phenol, sulfite, phenylalkane, phosphite or amine type stabilizers, antioxidants, weathering stabilizers, antistatic agents, and lubricants such as metallic soap and wax in approximately the same amount as used in olefin plastics or olefin copolymer rubber.

In the present invention, the modified polyolefin elastomers may be prepared by dynamically heat treating the blend of the aforesaid components in the presence of an organic peroxide to partially crosslink said blend.

By the term dynamically heat treating is meant that the blend is kneaded in a molten state.

The organic peroxide used in the preparation of the modified polyolefin elastomers in the present invention includes concretely dicumyl peroxide, di-tert-butyl peroxide, 2,5-dimethyl-2,5-di(tert-butylperoxy)hexane, 2,5-dimethyl-2,5-di(tert-butylperoxy)hexine-3, 1,3-bis(tert-butylperoxyisopropyl)benzene, 1,1-bis(tert-butylperoxy)-3,3,5-trimethylcyclohexane, n-butyl-4,4-bis(tert-butylperoxy)valerate, benzoyl peroxide, p-chlorobenzoyl peroxide, 2,4-dichlorobenzoyl peroxide, tert-butyl peroxybenzoate, tert-butyl perbenzoate, tert-butyl peroxyisopropylcarbonate, diacetyl peroxide, lauryoyl peroxide, tert-butylcumyl peroxide, etc.

Of the organic peroxides exemplified above, particularly preferred are 2,5-dimethyl-2,5-di(tert-butylperoxy)hexane, 2,5-dimethyl-2,5-di(tert-butylperoxy)hexine-3, 1,3-bis(tert-butylperoxyisopropyl)benzene, 1,1-bis(-tert-butylperoxy)-3,3,5-trimethylcyclohexane and n-butyl-4,4-bis(tert-butylperoxy)valerate, from the standpoint of odor and scorch stability. Above all, most preferable is 1,3-bis (tert-butylperoxyisopropyl)benzene.

The amount of the organic peroxide used is 0.05-3% by weight, preferably 0.1-1% by weight based on the total weight of the above-mentioned components (a), (b) and (c). By the use of the organic peroxide in the amount as defined above, the resulting modified polyolefin elastomers are found to have satisfactory heat resistance, tensile characteristics and rubbery-properties such as elastic recovery and resilience, and excellent moldability..

The content of the component (c) in the modified polyolefin elastomer compositions is measured by infrared absorption analysis or chemical analysis.

The kneading apparatuses used in kneading the aforementioned blend are conventionally known, such as open type mixing roll or closed type Banbury mixer, extruder, kneader and continuous mixer, and the kneading is preferably carried out in the closed type apparatuses in an inert gas atmosphere such as nitrogen or carbon dioxide gas. The blend is kneaded at a temperature at which the half life of the organic peroxide used becomes less than 1 minute, usually 150°-280° C., preferably 170°-240° C. for 1-20 minutes, preferably 1-10 minutes. The shearing force to be applied is a shearing rate of usually $10-10^4 \sec^{-1}$, preferably $10^2-10^3 \sec^{-1}$.

In the present invention, at the time of the aforesaid partial crosslinking treatment with the organic peroxides, there may be used peroxy crosslinking assistants such as sulfur, p-quinone dioxime, p,p'-dibenzoylquinone dioxime, N-methyl-N,4-dinitrosoaniline, nitrobenzene, diphenyl guanidine and trimethylolpropane-N,N'-m-phenylenedimaleimide, or polyfunctional methacrylate monomers such as divinylbenzene, triallylcyanurate, ethylene glycol dimethacrylate, diethylene glycol dimethacrylate, polyethylene glycol dimethacrylate, trimethylolpropane trimethacylate and allyl methacrylate or polyfunctional vinyl monomers such as vinyl butyrate or vinylstearate. Uniform and mild crosslinking reactions can be expected when these compounds are used. When divinylbenzene is used in the present invention, the modified polyolefin elastomer compositions having uniform crosslinking effects after heat treatment and a favorable balance between flowability and physical properties are obtained, because divinylbenzene is easy to handle and the above-mentioned treated product becomes favorable in compatibility to the main components, i.e. the olefin rubber and olefin plastics, and because divinylbenzene has an action of solubilizing organic peroxides and acts as dispersing agent for the peroxides. The amount of the crosslinking assistants or polyfunctional vinyl monomers used in the present invention is 0.1-2% by weight, preferably 0.3-1% by weight based on the whole of product to be treated, and by the use of said assistants or monomers in the above-mentioned range, there are obtained the compositions which are excellent in flowability and which do not bring about change in physical properties by heat history at the time of processing and molding said compositions.

In order to accelerate decomposition of the organic peroxides used, there may also be used decomposition accelerators, for example, tertiary amines such as triethylamine, tributylamine, 2,4,6-tris(dimethylamino)-phenol, etc., and naphthenate of aluminum, cobalt, vanadium, copper, calcium, zirconium, manganese, magnesium, lead, mercury or the like.

By the above-mentioned dynamical heat treatment in the presence of organic peroxides, partial crosslinking is effected and, at the same time, the modified polyolefin elastomers graft modified with the aforementioned component (c) are obtained.

In the present invention, the expression "the graft modified polyolefin elastomer has been partially crosslinked" is intended to designate the case wherein the gel content of said elastomer as measured by the following procedure is in the range of at least 20%, preferably 20-99.5% and particularly 45-98%.

Measurement of gel content 100 mg of a specimen of the thermoplastic elastomer is weighed and divided into small segments. 0.5 mm×0.5 mm×0.5 mm. The specimen is immersed in 30 ml of cyclohexane in a closed container at 23° C. for 48 hours, and the specimen is then taken out on a filter paper, followed by drying at room temperature. for at least 72 hours until a constant weight is reached.

From the weight of this dried residue are subtracted the weight of cyclohexane insolubles (fibrous filler, filler, pigment, etc.) other than the polymer component and the weight of the olefin plastics present in the specimen prior to the immersion in cyclohexane to obtain "a corrected final weight (Y)".

On the one hand, the weight of the peroxide crosslinking type olefin copolymer rubber in the specimen, i.e. "said weight is obtained by subtracting from the weight of the specimen (1) the weight of cyclohexane solubles (e.g. mineral oil or plasticizer) other than the peroxide crosslinking type olefin copolymer rubber, (2) the weight of the olefin plastics component and (3) the weight of cyclohexane insolubles (fibrous filler, filler, pigment, etc.) other than the polymer component", is taken as "a corrected initial weight (X)".

The gel content is obtained according to the following equation.

$$\text{Gel content (wt \%)} = \frac{\text{Corrected final weight } (Y)}{\text{Corrected initial weight } (X)} \times 100$$

The above-mentioned modified polyolefin elastomers are excellent in flexibility, heat resistance and low-temperature resistance and also in adhesion to polyamides, polyurethanes or polyesters.

Surface skin

The surface skin used in the present invention is composed of at least one polymer selected from the group consisting of polyamides, polyurethanes and polyesters.

The polyamides used in the invention are those obtained by polycondensation of aliphatic, alicyclic or aromatic diamines such as hexamethylenediamine, decamethylenediamine, dodecamethylenediamine, 2,2,4- or 2,4,4,-tirmethylhexamethylenediamine, 1,3- or 1,4-bis(aminomethyl)cyclohexane, bis(p-aminocyclohexylmethane) and m- or p-xylenediamine with aliphatic, alicyclic or aromatic dicarboxylic acids such as adipic acid, suberic acid, sebacic acid, cyclohexanedicarboxylic acid; polyamides obtained by condensation of aminocarboxylic acods such as ε-caproic acid and 11-aminoundecanoic acid; polyamides obtained from lactams such as ε-caprolactam and ω-laurolactam or polyamides(copolymers) comprising these components; and mixtures of these polyamides. Concrete examples of these polyamides include nylon 6, nylon 66, nylon 610, nylon 9, nylon 11, nylon 12, nylon 6/66, nylon 66/610 and nylon 6/11.

The polyurethanes used in the invention include every polyurethane known, per se. For example, polyester type polyurethanes and polyether type polyurethane classified from the standpoint of starting polyol components, and soft, semirigid or rigid polyurethanes classified from the standpoint of hardness are all usable.

When the laminated molded articles of the present invention are used as internal trim parts of vehicles such as automobile, the surface skin of the present laminated molded articles is suitably formed from polyurethane sheet. In this case, thermoplastic polyurethanes are desirably used for forming the surface skin from the standpoint of easiness of lamination.

The polyesters used in the invention as materials for forming the surface skin include concretely thermoplastic polyesters such as polyethylene terephthalate, polybutylene terephthalate and polyethylene isophthalate.

The polyamides, polyurethanes and polyesters illustrated above are excellent in heat resistance, oil resistance, solvent resistance, abrasion resistance and flaw resistance, and hence these polymers are most suitable for use as materials for forming the surface outer layers of the molded articles.

The surface skin as obtained above may be decorated by gigging its surface, and the laminated articles having the surface skin decorated by gigging come to have further improved soft touch and hand feeling and, at the same time, excellent oil resistance, solvent resistance and abrasion resistance.

The decorated surface skin by gigging may be obtained by conventionally known methods of decoration by gigging, for example, (a) a method of buffing the surface of the skin with emery paper, (b) a method of passing the surface of the skin through a card cloth roll, (c) a method of sanding the surface of the skin by a belt sander or a drum sander and (d) a method of allowing the surface of the skin to collide with hot micro solids, as disclosed in Japanese Pat. L-O-P Publn. No. 275732/1987.

The first laminated molded articles having the above described structure of core layer/interlayer (I)/inter layer (II)/surface skin are obtained by the following first, second or third process of the present invention.

The first process for preparing the laminated articles of the present invention is illustrated below.

In the first step of the first process of the invention, a preform having a concavity is obtained by preheating a three-layer sheet comprising the interlayer (I) composed of the aforementioned polyolefin foam, polyurethane foam or thermoplastic elastomer foam, the interlayer (II) composed of the aforementioned modified polyolefin elastomer, and the surface skin composed of the aforementioned polymer, followed by applying by attraction this three-layer sheet to the cavity inner wall surface of a vacuum forming mold.

The above-mentioned three-layer sheet may be prepared, for example, by a process which comprises fusion bonding together the sheet composed of the above-mentioned polyolefin foam, polyurethane foam or thermoplastic elastomer foam, the sheet composed of the above-mentioned modified polyolefin elastomer and the sheet composed of the above-mentioned polymer by using a molding machine such as a calender roll or compression molding machine, though the process may vary according to the shape, size and required physical properties of the end product.

The above-mentioned surface skin may be subjected on its surface, if necessary, to embossing by using an embossing roll, or may be printed to have characters, pictures or patterns on its surface.

In the three-layer sheet mentioned above, the interlayer (I) has a thickness of 0.5–10 mm, the interlayer (II) has a thickness of 0.1–50 mm, and the surface skin has a thickness of 5–500 μm, though the thickness may vary according to the purpose for which the resulting laminated molded article is used.

In the first process for preparing the laminated molded articles of the invention, there is used an apparatus, for example, as shown in FIG. 1. As shown in (a)–(d) of FIG. 1, this apparatus is equipped with at least one pair of male and female injection molding mold (1, 2) capable of vacuum forming. In the female mold 1, there is formed an air suction passage 7 connected to a vacuum pump 6 to negatively pressurize the inside of a cavity 3. The inner wall surface of cavity of the female mold 1 may be engraved, if necessary, with emboss or grain pattern.

In a pair of male and female molds (1, 2) at a state where the molds are open, the above-mentioned three-layer sheet 4 is spread so as to cover an opening of cavity of the female mold 1 (see (a) of FIG. 1), and said three-layer sheet 4 at the opening is preheated by bringing a heater 5 of a preheating device close thereto. The preheating temperature employed is usually 150°–200° C. The preheating may be carried out, besides the approach of the heater 5, by various means such as blowing of hot air, contact with a heating roll and the like.

Thereafter, the inside of cavity 3 of the female mold 1 is negatively pressurized by suction of the vacuum pump 6, and the three-layer sheet 4 is applied by attraction closely to the inner wall surface of said cavity to obtain a preform (see (b) of FIG. 1).

At that time, the three-layer sheet 4 is applied closely to the inner wall surface of the cavity 3 in conformity with the shape of cavity of the mold (1, 2), and neither partial cracks nor creases are brought about. Furthermore, when the inner wall surface of cavity of the female mold 1 has a grain pattern, said pattern is quite favorably transferred onto the surface of the skin, because the three-layer sheet deeply encroaches upon uneven portions of said pattern.

Subsequently, in the second step of the first process of the invention, a molded article having a concavity is obtained by clamping the preform obtained in the first step in a state where said preform has been applied closely to the inner surface wall of the above-mentioned vacuum forming mold or in a state where said preform has been applied closely to the inner wall surface of a separate vacuum forming mold.

The above-mentioned clamping is carried out, as shown in FIG. 1 (c), by using a pair of male and female molds (1, 2).

Finally, in the third step of the first process of the invention, a laminated molded article is obtained by injecting a synthetic resin in a fluid plasticized state into the concavity of the molded article obtained in the above-mentioned second step.

The synthetic resin in a state of fluid plasticized state as mentioned above is intended to designate a molten resin obtained by heating, kneading and dispersing a synthetic resin by means of a screw type extrusion machine, or a synthetic resin obtained by bringing said resin to a fluid plasticized state by using solvents.

The above-mentioned injection molding is carried out by injecting the synthetic resin in a fluid plasticized state into the concavity of the molded article through a nozzle 8 of the injection molding machine and clamping, and taking out the first laminated molded article of the present invention as a product after solidification of the resin by cooling or heating the mold.

A trimming operation for taking out the product may be carried out in the mold (1, 2) simultaneously with the clamping operation, and hence there is no need for trimming in the subsequent step.

Subsequently, the second process for preparing the laminated molded article of the present invention is illustrated hereinafter.

In the first step of the second process of the invention, a preform having a concavity is obtained by preheating a three-layer sheet comprising the interlayer (I) composed of the aforementioned polyolefin foam, polyurethane foam or thermoplastic elastomer foam, the interlayer (II) composed of the aforementioned modified polyolefin elastomer, and the surface skin composed of the aforementioned polymer, followed by applying said three-layer sheet by attraction closely to the inner wall surface of cavity of a vacuum forming mold.

The above-mentioned three-layer sheet is the same as that illustrated in the process for preparing the first laminated molded article of the invention.

Figure 2:
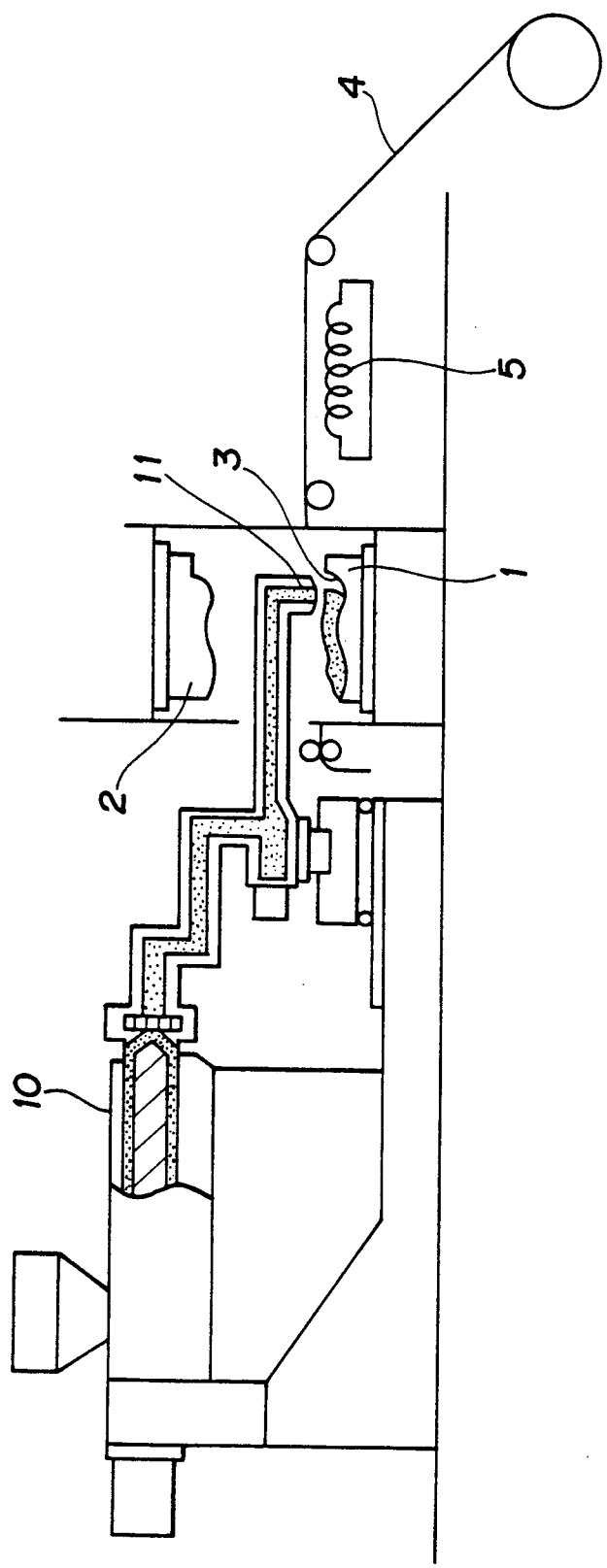
FIG. 2 is a rough sketch of one apparatus used in the processes for preparing the laminated molded articles of the present invention.

In the second process of the invention, there may be used an apparatus, for example, as shown in FIG. 2.

This apparatus, as shown in FIG. 2, is equipped with a pair of molding molds (1, 2) having a female mold below and a male mold above. In the molds (1, 2) at a state of being opened, the above-mentioned three-layer sheet 4 is placed between the mold (1, 2) while preheating by a heater 5 of a preheating device, said three-layer sheet 4 is spread so as to cover an opening of cavity of the female mold 1, and thereafter said three-layer sheet is applied closely to the inner wall surface of cavity of the molds (1, 2) by suction by means of a vacuum pump 6 to obtain a preform having a concavity. In this case, adhesion of the three-layer sheet to the mold cavity 3 and transfer of a grain pattern are favorable as in the case of the first process of the invention as aforesaid.

In the second step of the second process of the invention, a synthetic resin in a fluid plasticized state is stamp molded by casting said resin into the concavity of the preform applied closely to the inner wall surface of cavity of the above-mentioned vacuum molding mold or into the concavity of the preform applied closely to the inner wall surface of cavity of a separate vacuum molding mold.

The above-mentioned synthetic resin in a fluid plasticized state is extruded from an extrusion machine 10 and casted through an injection nozzle 11 into the concavity of the preform. In the second process of the invention, the injection nozzle 11 capable of moving in the X-Y direction over the concavity zone of the preform is allowed to move according to the locus of the predetermined program, and the synthetic resin in a fluid plasticized state may be injected through said nozzle into the whole zone of the concavity of said preform.

The synthetic resin in a fluid plasticized state as referred to herein has the same meaning as defined in the above-mentioned first process of the present invention.

The above-mentioned stamp molding is carried out by clamping by using the mold 2. By carrying out this clamping, the cavity 3 is filled with the synthetic resin in a fluid plasticized state by the extrusion pressure of the molds (1, 2). After solidification of the resulting molded article by subsequent cooling operation or the like, the first laminated molded article of the invention as a product is taken out from the molds (1, 2).

In this case, no trimming operation subsequent to the above-mentioned step is required for the same reason as explained in the first process of the present invention illustrated above.

The third process for preparing the laminated molded article of the present invention is illustrated hereinafter.

In the third process for preparing the laminated molded article of the invention, a four-layer sheet comprising the core layer of the aforementioned synthetic resin, the interlayer (I) of the aforementioned polyolefin foam, polyurethane foam or thermoplastic elastomer foam, the interlayer (II) of the aforementioned modified polyolefin elastomer, and the surface skin of the aforementioned polymer is preheated and then vacuum formed.

The above-mentioned four-layer sheet may be obtained by fusion bonding together a sheet of the above-mentioned synthetic resin, a sheet of the above-mentioned polyolefin foam or polyurethane foam, a sheet of the above-mentioned modified polyolefin elastomer and a sheet of the above-mentioned polymer by a molding machine such as a calender roll, compression molding machine or the like, though the process for preparing said four-layer sheet may vary according to the shape, size and required physical properties of the final product in the same manner as in the case of the aforementioned three-layer sheet.

In the third process of the invention, the surface skin of the above-mentioned polymer may be embossed on its surface or may be printed on its surface with characters, pictures or patterns. In this case a grain pattern may be formed by using a vacuum molding mold having a grain pattern on the inner wall surface thereof.

Though a thickness of each layer of the above-mentioned four-layer sheet may vary according to the purpose for which the resulting laminated molded article is used, generally the core layer has a thickness of 0.1–50 mm, the interlayer (I) has a thickness of 0.5–10 mm, the interlayer (II) has a thickness of 0.1–50 mm, and the surface skin has a thickness of 5–500 $\mu$m.

The above-mentioned preheating temperature is usually 150°–250° C.

In the third process of the invention, the above-mentioned four-layer sheet may be vacuum formed using either a vacuum forming concave mold or a vacuum forming convex mold.

By carrying out the above-mentioned vacuum forming, the first laminated molded article of the present invention is obtained, and the laminated molded article thus obtained is trimmed usually after the completion of the above-mentioned vacuum forming.

Next, the second laminated molded article of the present invention is illustrated hereinafter.

The second laminated molded article comprises the core layer of the aforementioned synthetic resin, the interlayer (II) of the aforementioned modified polyolefin elastomer and the surface skin of the aforementioned polymer, and the sole difference between the above-mentioned second molded article and the first laminated molded article of the present invention is whether or not the interlayer (I) of the aforementioned polyolefin foam or polyurethane foam is present therein. Accordingly, the core layer, interlayer (II) and surface skin of the above-mentioned second laminated molded article are the same as those of the aforementioned first laminated molded article of the present invention.

The second laminated molded article of the invention having such a three-layer structure of core layer/interlayer (II)/surface skin as mentioned above may be obtained by the fourth, fifth or sixth process of the invention as will be illustrated hereinafter.

The fourth process for preparing the laminated molded article of the invention is substantially the same as the first process of the present invention except that a two-layer sheet comprising the interlayer (II) of the above-mentioned modified polyolefin elastomer and the surface skin of the above-mentioned polymer is used in place of the three-layer sheet used in the first process of the invention.

The above-mentioned two-layer sheet may be prepared, for example, by a process in which a sheet of the above-mentioned modified polyolefin elastomer and a sheet of the above-mentioned polymer are fusion bonded together by means of a molding machine such as a calender roll, compression molding machine or the like, a process in which the above-mentioned modified polyolefin elastomer is formed into a sheet by extrusion molding or calendering, and successively this sheet is fusion bonded with a sheet of the above-mentioned polymer previously formed, or a process in which the above-mentioned modified polyolefin elastomer and polymer are simultaneously extruded by means of a multilayer extrusion machine into two sheets which are then fusion bonded together, though the process may vary according to the shape, size and required physical properties of the final product.

The fifth process of the invention is illustrated hereinafter.

The fifth process of the invention is substantially the same as the aforementioned second process of the present invention except that a two-layer sheet comprising the interlayer (II) of the above-mentioned modified polyolefin elastomer and the surface skin of the above-mentioned polymer is used in place of the three-layer sheet used in said second process.

The above-mentioned two-layer sheet is the same as the two-layer sheet illustrated in the fourth process for preparing the laminated molded article of the present invention.

The sixth process for preparing the laminated molded article of the invention is illustrated hereinafter.

The sixth process for preparing the laminated molded article of the invention is substantially the same as the aforementioned third process for preparing the laminated molded article of the present invention except that a three-layer sheet comprising the core layer of the above-mentioned synthetic resin, the interlayer (II) of the above-mentioned modified polyolefin elastomer and the surface skin of the above-mentioned polymer is used in place of the four-layer sheet used in said third process.

The above-mentioned three-layer sheet is the same as the three-layer sheet illustrated in the aforementioned first process for preparing the laminated molded article of the present invention.

EFFECT OF THE INVENTION

The first laminated molded article of the present invention is composed of the core layer of a synthetic resin, the interlayer (I) of a polyolefin foam, polyurethane foam or thermoplastic elastomer foam, the interlayer (II) of a specific modified polyolefin elastomer and the surface skin of a specific polymer, and hence has such effects that it is excellent in heat resistance, low-temperature resistance, oil resistance, solvent resistance, abrasion resistance and flaw resistance and, at the same time, rich in soft touch. When the second laminated molded article of the invention has a grain pattern, it has such an effect, in addition to the above-mentioned effects, that the grain pattern formed thereon is sharp.

In accordance with the first, second and third processes for preparing the laminated molded article of the invention, there is obtained the first laminated molded article having such effects as mentioned above. Further, the second laminated molded article of the invention is composed of the core layer of a synthetic resin, the interlayer (II) of a specific modified polyolefin elastomer and the surface skin of a specific polymer, and hence it has such effects that it is excellent in heat resistance, low-temperature resistance, oil resistance, solvent resistance, abrasion resistance and flaw resistance and, at the same time, rich in soft touch. Further, when the second laminated molded article of the invention is intended to have a grain pattern, the resulting article has such an effect that the grain pattern formed thereon is sharp in addition to the above-mentioned effects.

In accordance with the fourth, fifth and sixth processes for preparing the laminated molded article of the invention, there is obtained the second laminated article having such effects as mentioned above.

In particular, when the surface skin of the second laminated molded article is decorated by gigging, there is such an effect that the resulting article is soft and excellent in hand feeling.

The laminated molded articles of the present invention as illustrated above can be used as materials for automobile trim and linings such as door trim, instrument panel, ceiling materials, etc., various types of cases and bags, and structural materials such as wall material and the like.

The present invention is illustrated below with reference to examples, but it should be construed that the invention is in no way limited to those examples.

First, the methods employed herein for the evaluation of adhesion between the layers, depth of grain pattern, soft touch, abrasion resistance, flaw resistance, oil resistance, solvent resistance, heat resistance and low temperature obtained in examples and comparative examples are shown below.

METHOD OF EVALUATION (1) Adhesion between layers

1) Tensile peel test

The surface skin of a specimen was stripped from one end of the specimen and peeled off by pulling the stripped surface skin in the inverse direction of 180° at a pulling rate of 25 mm/min, and a maximum pulling load applied was divided by the width of the specimen to obtain a value which was then taken as an adhesion strength between the surface skin and the interlayer (II).

In evaluating adhesion between the interlayer (II) and the interlayer (I) or the core layer, the interlayer (II) was peeled off in the same manner as in the above case to obtain an adhesion strength therebetween, and evaluation of adhesion between the interlayer (I) and the core layer was conducted in the same manner as above by peeling the interlayer (I).

Figure 3:
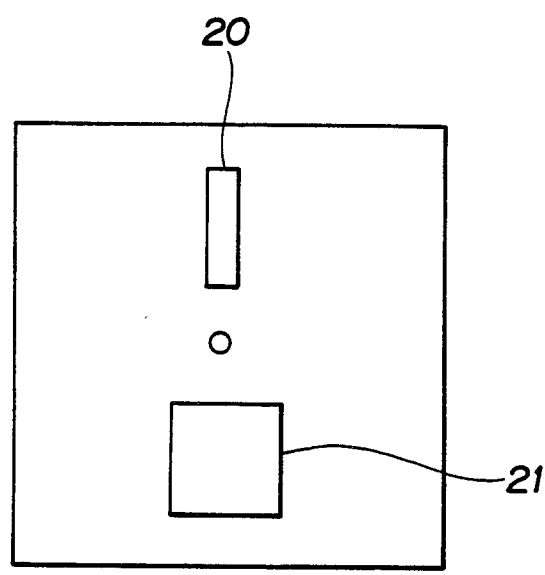
FIG. 3 is a plane view showing the place of the product from which a specimen is taken.

The specimen used had a size of a length of 100 mm and a width of 25 mm, and was collected from the portion of the laminated molded article as shown in FIG. 3.

2) Cross-cut adhesion test

The surface of a specimen was cut by a sharp razor so as to make 11 cuts in parallel at an interval of 2 mm and a depth of 1 mm, and 11 cuts were also made in perpendicular thereto in the same manner as above.

By this cross-cutting the surface of the specimen, there were formed 100 squares of 2 mm. A scotch tape (made by Nichiban K.K.) was applied to the specimen so as to cover all the 100 squares, and the tape was vigorously peeled off therefrom to inspect the peeled state.

The result obtained in the above test was expressed in terms of the number of squares remained unpeeled/100. The result of 100/100 indicates that no square was peeled off at all, and that of 0/100 indicates that all the squares peeled off.

The specimen used had a length of 100 mm and a width of 100 mm, and was collected from the portion of the laminated molded article as shown in FIG. 3.

(2) Depth of the grain pattern

A distance from the crest to the bottom of the emboss transferred onto the surface of laminated molded article was measured.

(3) Soft touch

Touch obtained by laying a hand on the surface of laminated molded article was evaluated by the following five-point rating.
5 ... Very soft
4 ... Soft
3 ... Ordinary
2 ... Hard
1 ... Very hard (4) Abrasion resistance Taber abrasion test was conducted using CS-11 wheel under a load of 500 g to measure a Taber-volume loss of the laminated molded article tested after 1000 revolutions.

(5) Flaw resistance

Using a Taber type scratch tester, an edge of cutter is brought into contact with the specimen surface under a load of 100 g, and after one revolution at 1 rpm, the scratch formed on said surface was inspected.
Evaluation point:
A: no scratch was observed at all
B: Scratch was observed slightly
C: Scratch was observed apparently (6) Oil resistance 1 g of JIS No. 3 oil was dropped on the specimen surface, and the specimen was allowed to stand at 70° C. for 168 hours. Thereafter, the temperature was lowered to room temperature, and said surface was strongly rubbed with flannel to inspect whether or not a change occurred on the surface.

Evaluation point:
A: No change was observed at all.
B: Trace of milky turbidity or the like was observed.
C: Damage was caused by delamination or dissolution.

(7) Solvent resistance

The specimen surface was strongly rubbed with flannel impregnated with industrial gasoline to inspect a change on said surface.
Evaluation point:
A: No change was observed at all.
B: Trace of milky turbidity or the like was observed.
C: Damage was caused by delamination or dissolution.

(8) Heat resistance

A dumbbell specimen No. 1 stipulated in JIS K6301 was blanked from the specimen sheet from the lengthwise direction and allowed to stand at 120° C. for 500 hours. Thereafter, the temperature was lowered to room temperature, and the specimen was subjected to tensile testing at a rate of 200 mm/min to measure fracture elongation (E Baged). On one hand, fracture elongation (E Borig) of the specimen prior to heat aging was measured beforehand, and a retentivity of E Baged was calculated.

$$AR\ (EB)\ \% = E\ Baged\ /\ E\ Borig \times 100$$

(9) Low-temperature resistance

A specimen of 20 mm in width and 100 mm in length was collected from the sheet, and the specimen exposing its surface skin outside was folded while putting both ends thereof one upon another, and the end of the specimen opposite to the bent portion was fixed. Thereafter, the specimen was allowed to stand at $-30°$ C. for 20 minutes, and a falling object having 5 kg in weight was dropped from a height of 5 cm onto the bent portion to inspect whether cracks of the surface skin were caused or not.

Embodiments of the First Process of the Invention

EXAMPLE 1

(i) Preparation of a three-layer sheet comprising a polypropylene foam layer, a modified polyolefin elastomer layer and a polyamide layer A mixture comprising 80 parts by weight of an ethylene/propylene/5-ethylidene-2-norbornene copolymer rubber (hereinafter called EPDM (1) for short) containing 70 mol% of ethylene and having an iodine value of 12 and a Mooney viscosity $ML_{1+4}$ (100° C.) of 120 and 20 parts by weight of polypropylene (hereinafter Called PP for short) having MFR (ASTM D 1238-65T, 230° C.) of 13 g/10 min and a density of 0.91 g/cm$^3$ was kneaded in a nitrogen atmosphere with a Banbury mixer at 180° C. for 5 minutes, and the kneadate was then passed through a roll to obtain a sheet which was formed into square pellets by using a sheet cutter.

Subsequently, 100 parts by weight of the square pellets, 0.3 part by weight of 1,3-bis(tert-butylperoxyisopropyl)benzene (hereinafter called peroxide (a) for short), 0.5 part by weight of divinylbenzene (hereinafter called DVB for short) and 0.5 part by weight of maleic anhydride (hereinafter called MAH for short) were mixed with stirring by means of a Henschel mixer. The mixture was then extruded at 220° C. in a nitrogen atmosphere with a single screw extruder of L/D 30 and a screw diameter of 50 mm to prepare a graft modified polyolefin elastomer (hereinafter caled TPE-A for short).

Subsequently, TPE-A was extruded through T-die extrusion molding machine of 90 mm in diameter (manufactured by Toshiba Kikai K.K.) into a sheet-like form under the conditions where the screw is full flight, L/D=22, extrusion temperature is 220° C., T-die is a cost hanger die and take-off speed is 2.5 m/min. The extruded sheet-like TPE-A in a molten state was then sandwiched with a polyamide sheet (sold by Toray under a tradename of AMIRAN CM 1021, nylon 6, thickness of 50 μm) and a polypropylene foam (sold by Toray under a tradename of PPAN 20030, extent of expansion 20, thickness 3 mm), and the sandwich structure was then passed through a pair of rolls so that the polypropylene foam is in contact with a roll kept at a roll temperature of 60° C. and the polyamide sheet is in contact with a roll of room temperature, whereby a three-layer sheet was prepared, in which the modified polyolefin elastomer layer has a thickness of 0.7 mm, the polyamide layer has a thickness of 50 μm, and the polypropylene foam layer has a thickness of 3 mm.

(ii) Preparation of thermoplastic elastomer for core

A mixture comprising 70 parts by weight of EPDM (1), 30 parts by weight of PP, 10 parts by weight of butyl rubber (sold by Esso, 11R-065, unsaturation degree 0.8 mol%, hereinafter called 11R for short) and 30 parts by weight of a paraffin process oil (hereinafter called the oil for short) was kneaded by means of a Banbury mixer in a nitrogen atmosphere at 190° C. for 5 minutes, and the kneadate was then passed through a roll, square pellets being obtained from the rolled product by using a sheet cutter.

Subsequently, 100 parts by weight of the square pellets, 0.3 part by weight of peroxide (a) and 0.5 part by weight of DVB were mixed with stirring by means of a Henschel mixer. The pellets thus obtained were extruded through an extruder in a nitrogen atmosphere at 220° C. to obtain a thermoplastic elastomer (hereinafter called TPE (I)), having MFR of 3 g/10 min.

(iii) Preparation of a laminated molded article

The above-mentioned three-layer sheet was preheated and applied by vacuum forming closely to the inner wall surface of cavity of a pair of molds so that the polyamide layer is positioned to the side of a female mold provided on its inner wall surface with a grain pattern of a depth of 150 μm, followed by draw forming. Thereafter, the female mold was closed, and the thermoplastic elastomer for core TPE (1) was injected through a nozzle of injection molding machine into the cavity and solidified. At the time when TPE (1) was integrated with the above-mentioned three-layer sheet, the molds were opened to obtain a four-layer laminated molded article.

The conditions under which the above-mentioned vacuum molding was carried out are as follows:
Heater temperature: 360° C.
Preheating time: 45 seconds
Vacuum pressure: 700 mmHg
The conditions under which the above-mentioned injection molding was carried out are as follows:

Molding machine: Dynamelter (manufactured by Meiki Seisakusho K.K.)
Molding temperature: 220° C.
Injection pressure:
    Primary pressure: 1000 kg/cm$^2$
    Secondary pressure: 700 kg/cm$^2$
Injection speed: Maximum
Molding cycle: 90 sec/ cycle
Gate: Direct gate (land length 10 mm, width 10 mm and thickness 3 mm)

In the thus obtained four-layer laminated molded article, adhesion between the polyamide layer [(surface skin)] and polypropylene foam layer [interlayer (I)], adhesion between TPE-A layer [interlayer (II)] and TPE (1) layer (core layer), depth of grain pattern, soft touch, abrasion resistance, flaw resistance, oil resistance, solvent resistance, heat resistance and low-temperature resistance were evaluated according to the aforementioned method of evaluation.

Results obtained are shown in Table 1.

EXAMPLE 2

A four-layer laminated molded article was obtained by repeating Example 1 except that preparation of the three-layer sheet in (i) of Example 1 and preparation of the thermoplastic elastomer for core in (ii) of Example 1 were carried out in the following manner, and the four-layer molded article obtained was evaluated.

(i) Preparation of three-layer sheet

A graft modified polyolefin elastomer (hereinafter called TPE-B for short) was prepared by repeating the process for the preparation (i) three-layer sheet of Example 1 except that 60 parts by weight of EPDM (1) and 40 parts by weight of PP were used, and further 20 parts by weight of 11R and 40 parts by weight of the oil were used. Subsequently, a three-layer sheet was prepared from this TPE-B, a polypropylene foam and a polyamide sheet (nylon 12 produced by Daicel Hules Co., a tradename Daiamide L2140, thickness 50 μm) in the same manner as in Example 1. In the three-layer sheet thus obtained, the modified polyolefin elastomer layer (TPE-B layer) had a thickness of 0.7 mm, the polypropylene foam layer had a thickness of 3 mm, and the polyamide layer had a thickness of 50 μm.

(ii) Preparation of thermoplastic elastomer for core

A mixture comprising 60 parts by weight of a pelletized ethylene/propylene/ethylidene norbornene copolymer rubber (hereinafter called EPDM (2) for short) containing 78 mol% of ethylene, having an iodine value of 10 and a Mooney viscosity [$ML_{1+4}(100°$ C.)] of 160 and containing 40 parts by weight of an oil extender (accordingly the EPDM content is 43 parts by weight and the oil content is 17 parts by weight), 40 parts by weight of PP and 0.5 part by weight of 2,5-dimethyl-2,5-di(t -butylperoxy)hexine-3 (hereinafter called the peroxide (B) for short) was mixed with stirring by means of a Henschel mixer. Subsequently, this mixture was extruded in a nitrogen atmosphere at 220° C. by means of a Warnner double screw extruder (L/D=43, intermesh type, revolving in the same direction, triple flighted screws) to obtain a thermoplastic elastomer (hereinafter called TPE (2) for short) having MFR of 15 g/10 min.

Results of evaluation obtained are shown in Table 1.

EXAMPLE 3

A four-layer laminated molded article was obtained by repeating Example 1 except that the three-layer sheet (i) of Example 1 was prepared by the following manner, and polypropylene (hereinafter called PP (1) for short) having a melt index (ASTM D-1238-65T, 230° C.) of 13 and a density of 0.91 g/cm³ was used in place of TPE (1), and the four-layer laminated molded article was evaluated in the same manner as in Example 1.

(i) Preparation of three-layer sheet

A three-layer sheet comprising a modified polyolefin elastomer layer (TPE-C layer) of 0.7 mm thick, polypropylene foam layer of 3 mm thick and polyester layer of 50 μm thick was prepared by repeating Example 1 except that in the preparation of the three-layer sheet in (i) of Example 1, 80 parts by weight of EPDM (1) and 20 parts by weight of PP were used, and further 10 parts by weight of 11R and 30 parts by weight of the oil were used to prepare square pellets of an unmodified polyolefin elastomer, that a graft modified polyolefin elastomer (hereinafter called TPE-C for short) was prepared by using glycidyl methacrylate in place of the maleic anhydride, and that a polyester sheet (Lumiler, sold by Toray, 50 μm in thickness) was used in place of the polyamide sheet.

Results of evaluation obtained are shown in Table 1.

EXAMPLE 4

A four-layer laminated molded article was obtained by repeating Example 1 except that the three-layer sheet (i) of Example 1 was prepared by the following manner, and polypropylene (hereinafter called PP (2) for short) having MFR of 5 g/10 min and containing 10% of finely divided talc and 10% of short glass fiber was used in place of TPE (1), and the four-layer laminated molded article obtained was evaluated in the same manner as in Example 1.

(i) Preparation of three-layer sheet

A three-layer sheet comprising a modified polyoletln elastomer layer (TPE-D layer) of 0.7 mm thick, polypropylene foam layer of 3 mm thick and thermoplastic polyurethane layer of 50 μm thick was prepared by repeating Example 1 except that in the preparation of the three-layer sheet in (i) of Example 1, a graft modified polyolefin elastomer (hereinafter called TPE-D for short) was prepared by using hydroxypropyl methacrylate in place of the maleic anhydride, and that a polyurethane sheet (thermoplastic polyurethane P26SRNAT produced by Nippon Urethane K.K., 50 μm in thickness) was used in place of the polyamide sheet.

Results of evaluation obtained are shown in Table 1.

EXAMPLE 5

A four-layer laminated molded article was obtained by repeating Example 1 except that the three-layer sheet (i) of Example 1 was prepared by dry blending 80 parts by weight of the graft modified polyolefin elastomer (TPE-A) of Example 1 and 20 parts by weight of low density polyethylene (density 0.917 g/cm³, melt index 6.5 (190° C.)) and feeding the blend to the T-die extrusion molding machine, the prepared three-layer sheet comprising a modified polyolefin elastomer layer (TPE-E layer) of 0.7 mm thick, polypropylene foam layer of 3 mm thick and polyamide layer of 50 μm thick. The four-layer laminated molded article obtained was evaluated in the same manner as in Example 1.

Results of evaluation obtained are shown in Table 1.

COMPARATIVE EXAMPLE 1

A three-layer laminated molded article was obtained by repeating Example 1 except that a soft polyvinyl chloride sheet (0.75 mm thick) containing 50 parts by weight of dioctyl phthalate was used in place of the three-layer sheet, and the three-layer laminated molded article obtained was evaluated in the same manner as in Example 1.

Results of evaluation obtained are shown in Table 1.

COMPARATIVE EXAMPLE 2

A three-layer laminated molded article was obtained by repeating Example 1 except that TPE-A single-layer sheet not laminated with the polyamide sheet was used in place of the three-layer sheet, and the three-layer laminated molded article obtained was evaluated.

Results of evaluation obtained are shown in Table 1.

COMPARATIVE EXAMPLE 3

A four-layer laminated molded article was obtained by repeating Example 1 except that the three-layer sheet (i) of Example 1 was prepared without effecting graft modification, the prepared three-layer sheet comprising an unmodified polyolefin elastomer layer (TPE-F layer) of 0.7 mm thick, polypropylene foam layer of 3 mm thick and polyamide layer of 50 μm thick, and the four-layer laminated molded article obtained was evaluated in the same manner as in Example 1.

Results of evaluation obtained are shown in Table 1.

TABLE 1

| | Example 1 | Example 2 | Example 3 | Example 4 | Example 5 | Compar. Example 1 | Compar. Example 2 | Compar. Example 3 |
|---|---|---|---|---|---|---|---|---|
| Process | 1 | 1 | 1 | 1 | 1 | 1 | 1 | 1 |
| Structure of laminated molded article | | | | | | | | |
| Surface skin | Polyamide | Polyamide | Polyester | Polyurethane | Polyamide | PVC | TPE-A | Polyamide |
| Interlayer (II) | TPE-A | TPE-B | TPE-C | TPE-D | TPE-E | | | TPE-F |
| Interlayer (I) | PP foam | PP foam | PP foam | PP foam | PP foam | PP foam | PP foam | PP foam |
| Core layer | TPE(1) | TPE(2) | PP(1) | PP(2) | TPE(1) | TPE(1) | TPE(1) | TPE(1) |
| Adhesion between layers | Failure | Failure | Failure | Failure | Failure | — | — | less than 0.5 |
| Peeling strength [kg/cm] *1 | Failure | Failure | Failure | Failure | Failure | less than 0.5 | Failure | Failure |
| Cross-cut adhesion test *1 | 100/100 | 100/100 | 100/100 | 100/100 | 100/100 | — | — | 0/100 |
| | 100/100 | 100/100 | 100/100 | 100/100 | 100/100 | 0/100 | 100/100 | 100/100 |
| Depth of grain pattern [μm] | 125 | 135 | 130 | 130 | 140 | 90 | 125 | 125 |
| Soft touch | 5 | 5 | 4 | 4 | 5 | 5 | 5 | 5 |
| Abrasion resistance [mg] | less than 1 | less than 1 | less than 1 | less than 1 | less than 1 | 20 | 30 | *2 |

TABLE 1-continued

|  | Example 1 | Example 2 | Example 3 | Example 4 | Example 5 | Compar. Example 1 | Compar. Example 2 | Compar. Example 3 |
|---|---|---|---|---|---|---|---|---|
| Flaw resistance | A | A | A | A | A | B | C | C |
| Oil resistance | A | A | A | A | A | A | C | C |
| Solvent resistance | A | A | A | A | A | A | C | C |
| Heat resistance [%] | 98 | 95 | 95 | 95 | 97 | 10 | 97 | 95 |
| Low-temp. resistance *3 | None | None | None | None | None | Found | None | None |

*1 The upper row shows adhesion between the surface skin and interlayer (II) or (I), and the lower row shows adhesion between the interlayer (I) and core layer.
*2 Measurement was inoperable owing to delamination of the polyamide layer.
*3 Existence of cracking or splitting is shown.

Embodiments of the Second Process of the Invention

EXAMPLE 11

A four-layer laminated molded article was prepared by repeating Example 1 except that the laminated molded article (iii) of Example 1 was prepared in the following manner. The four-layer laminated molded article obtained was evaluated in the same manner as in Example 1.

(iii) Preparation of laminated molded article

The three-layer sheet of Example 1 was preheated and applied by vacuum forming closely to the inner wall surface of cavity of the female mold provided on said surface with a grain pattern having a depth of 150 μm so that the polyamide layer constituting said three-layer is positioned to the side of the female side, followed by draw forming. Thereafter, the thermoplastic elastomer TPE (1) for core in a molten state was placed uniformly on the three-layer sheet, and the male mold was closed and, at the time when TPE (1) solidified and was integrated with the said three-layer sheet, the molds were opened to obtain a four-layer laminated molded article.

The conditions under which the above-mentioned vacuum forming was carried out are the same as those employed in Example 1.

The conditions under which the above-mentioned stamp molding was carried out are as follows:
Molding machine: ISM-300 manufactured by Ikegai
Screw diameter: 50 mmφ
Resin temperature: 230° C.
Pressing pressure: 200 kg/cm²
Molding cycle: 50 sec/1 cycle
Molded article: 500 mm in length, 500 mm in width and 3 mm in thickness Results of evaluation obtained are shown in Table 1.

EXAMPLE 12

A four-layer laminated molded article was obtained by repeating Example 11 except that the three-layer sheet of Example 2 and TPE (2) of Example 2 were used in place of the three-layer sheet of Example 11 (the three-layer sheet of Example 1) and TPE (1). The four-layer laminated molded article obtained was evaluated in the same manner as in Example 1.

Results of evaluation obtained are shown in Table 2.

EXAMPLE 13

A four-layer laminated molded article was obtained by repeating Example 11 except that the three-layer sheet of Example 3 and polypropylene (hereinafter called PP (3) for short) having a melt index (ASTM D 1238-65T, 230° C.) of 3 and a density of 0.91 g/cm³ were used in place of the three-layer sheet of Example 11 (the three-layer sheet of Example 1) and TPE (1). The four-layer laminated molded article obtained was evaluated in the same manner as in Example 1.

Results of evaluation obtained are shown in Table 2.

EXAMPLE 14

A four-layer laminated molded article was obtained by repeating Example 11 except that the three-layer sheet of Example 4 and polypropylene (hereinafter called PP (4) for short) having MFR of 0.7 g/10 min and containing 15% of finely divided talc and 15% of short glass fiber were used in place of the three-layer sheet of Example 11 (the three-layer sheet of Example 1) and TPE (1). The four-layer laminated molded article obtained was evaluated in the same manner as in Example 1.

Results of evaluation obtained are shown in Table 2.

EXAMPLE 15

A four-layer laminated molded article was obtained by repeating Example 11 except that the three-layer sheet of Example 5 and PP (4) of Example 4 were used in place of the three-layer sheet of Example 11 (the three-layer sheet of Example 1) and TPE (1). The four-layer laminated molded article obtained was evaluated in the same manner as in Example 1.

Results of evaluation obtained are shown in Table 2.

COMPARATIVE EXAMPLE 11

A three-layer laminated molded article was obtained by repeating Example 11 except that the soft polyvinyl chloride sheet (0.75 mm in thickness) of Comparative Example 1 was used in place of the three-layer sheet of Example 11. The three-layer laminated molded article was evaluated in the same manner as in Example 1.

Results of evaluation obtained are shown in Table 2.

COMPARATIVE EXAMPLE 12

A three-layer laminated molded article was obtained by repeating Example 11 except that TPE-A single sheet not laminated with the polyamide sheet was used in place of the three-layer sheet of Example 11. The three-layer laminated molded article obtained was evaluated in the same manner as in Example 1.

Results of evaluation obtained are shown in Table 2.

COMPARATIVE EXMAPLE 13

A four-layer laminated molded article was obtained by repeating Example 11 except that the three-layer sheet of Comparative Example 3 was used in place of the three-layer sheet of Example 11 (the three-layer sheet of Example 1). The four-layer laminated molded article obtained was evaluated in the same manner as in Example 1.

Results of evaluation obtained are shown in Table 2.

TABLE 2

|  | Example 11 | Example 12 | Example 13 | Example 14 | Example 15 | Compar. Example 11 | Compar. Example 12 | Compar. Example 13 |
|---|---|---|---|---|---|---|---|---|
| Process | 2 | 2 | 2 | 2 | 2 | 2 | 2 | 2 |
| Structure of laminated molded article |  |  |  |  |  |  |  |  |
| Surface skin | Polyamide | Polyamide | Polyester | Polyurethane | Polyamide | PVC | TPE-A | Polyamide |
| Interlayer (II) | TPE-A | TPE-B | TPE-C | TPE-D | TPE-E |  |  | TPE-F |
| Interlayer (I) | PP foam | PP foam | PP foam | PP foam | PP foam | PP foam | PP foam | PP foam |
| Core layer | TPE(1) | TPE(2) | PP(1) | PP(2) | TPE(1) | TPE(1) | TPE(1) | TPE(1) |
| Adhesion between layers | Failure | Failure | Failure | Failure | Failure | — | — | less than 0.5 |
| Peeling strength [kg/cm] *1 | Failure | Failure | Failure | Failure | Failure | less than 0.5 | Failure | Failure |
| Cross-cut adhesion test | 100/100 | 100/100 | 100/100 | 100/100 | 100/100 | — | — | 0/100 |
| *1 | 100/100 | 100/100 | 100/100 | 100/100 | 100/100 | 0/100 | 100/100 | 100/100 |
| Depth of grain pattern [μm] | 125 | 135 | 130 | 130 | 140 | 90 | 125 | 125 |
| Soft touch | 5 | 5 | 4 | 4 | 5 | 5 | 5 | 5 |
| Abrasion resistance [mg] | less than 1 | less than 1 | less than 1 | less than 1 | less than 1 | 20 | 30 | *2 |
| Flaw resistance | A | A | A | A | A | B | C | C |
| Oil resistance | A | A | A | A | A | A | C | C |
| Solvent resistance | A | A | A | A | A | A | C | C |
| Heat resistance [%] | 99 | 97 | 96 | 95 | 97 | 5 | 97 | 96 |
| Low-temp. resistance *3 | None | None | None | None | None | Found | None | None |

*1 The upper row shows adhesion between the surface skin and interlayer (II) or (I), and the lower row shows adhesion between the interlayer (I) and core layer.
*2 Measurement was inoperable owing to delamination of the polyamide layer.
*3 Existence of cracking or splitting is shown.

Embodiments of the Third Process of the Invention

EXAMPLE 21

Preparation of four-layer sheet

Using a T-die extrusion molding machine of 90 mmφ manufactured by Toshiba Kikai K.K., TPE-A and TPE (1) of Example 1 were extruded individually into a sheet-like form under the conditions where screw is in full flight, L/D=22, extrusion temperature is 220° C., T-die is a coat hanger die, and take-up speed is 2.5 m/min. The extruded sheets were laminated so as to form a laminate of the polyamide sheet of Example 1/TPE-A/the polypropylene foam of Example 1/TPE (1), and the laminate was passed through a pair of rolls, while allowing the TPE (1) sheet to come in contact with one roll kept at 60° C. and the polyamide sheet to come in contact with the other roll kept at room temperature, to prepare a four-layer sheet comprising the thermoplastic elastomer layer (TPE (1) layer) of 2 mm thick, the polypropylene foam layer of 3 mm thick, the modified polyolefin elastomer layer (TPE-A layer) of 0.7 mm thick and the polyamide layer of 50 μm thick.

Preparation of a laminated molded article

The four-layer sheet obtained above was preheated, applied by vacuum forming closely to the inner wall surface of cavity of a pair of molds so that the polyamide layer is positioned to the side of a female mold provided on its inner wall surface with a grain pattern of a depth of 150 μm, followed by drawforming. The molds were then opened to obtain a four-layer laminated molded article.

The conditions under which the above-mentioned vacuum forming was carried out are as follows:
Heater temperature: 360° C.
Preheating time: 100 seconds
Vacuum pressure: 700 mmHg In the four-layer laminated molded article thus obtained, adhesion between the polyamide layer (surface skin) and the TPE-A layer [interlayer (II)], adhesion between the polypropylene layer [interlayer (I)] and the TPE (1) layer (core layer), depth of grain pattern, soft touch, abrasion resistance, flaw resistance, oil resistance, solvent resistance, heat resistance and low-temperature resistance were measured according to the aforementioned method of evaluation.

Results of evaluation obtained are shown in Table 3.

EXMAPLE 22

A four-layer laminated molded article was obtained by repeating Example 21 except that TPE-B of Example 2 was used in place of the TPE-A, the polyamide sheet of Example 2 was used in place of the polyamide sheet of Example 21 (the polyamide sheet of Example 1), and TPE (2) of Example 2 was used in place of the TPE (1). The four-layer laminated molded article obtained was evaluated in the same manner as in Example 21.

Results of evaluation obtained are shown in Table 3.

EXAMPLE 23

A four-layer laminated molded article was obtained by repeating Example 21 except that TPE-C of Example 3 was used in place of TPE-A, the polyester sheet of Example 3 was used in place of the polyamide sheet of Example 21 (the polyamide sheet of Example 1), and PP (1) of Example 3 was used in place of TPE (1). The four-layer laminated molded article obtained was evaluated in the same manner as in Example 21.

Results of evaluation obtained are shown in Table 3.

EXAMPLE 24

A four-layer laminated molded article was obtained by repeating Example 21 except that TPE-D of Example 4 was used in place of TPE-A, the polyurethane sheet of Example 4 was used in place of the polyamide sheet of Example 21 (the polyamide sheet of Example 1), PP (2) of Example 4 was used in place of TPE (1). The four-layer laminated molded article obtained was evaluated in the same manner as in Example 21.

Results of evaluation obtained are shown in Table 3.

EXAMPLE 25

A four-layer laminated molded article was obtained by repeating Example 21 except that TPE-E of Example 5 was used in place of TPE-A. The four-layer laminated molded article obtained was evaluated. in the same manner as in Example 21.

Results of evaluation obtained are shown in Table 3.

COMPARATIVE EXAMPLE 21

A three-layer laminated molded article was obtained by repeating Example 21 except that the soft polyvinyl chloride sheet of Comparative Example 1 was used in place of the polyamide sheet, and TPE-A was not used. The three-layer laminated molded article obtained was evaluated in the same manner as in Example 21.

Results of evaluation obtained are shown in Table 3.

COMPARATIVE EXAMPLE 22

A three-layer laminated molded article was obtained by repeating Example 21 except that TPE-A of Example 1 was used in place of the polyamide sheet, and TPE-A as the interlayer (II) was not used. The three-layer laminated molded article obtained was evaluated in the same manner as in Example 21.

Results of evaluation obtained are shown in Table 3.

COMPARATIVE EXAMPLE 23

A four-layer laminated molded article was obtained by repeating Example 21 except that TPE-F of Comparative Example 3 was used in place of TPE-A. The four-layer laminated molded article obtained was evaluated in the same manner as in Example 21.

Results of evaluation obtained are shown in Table 3.

was kneaded in a nitrogen atmosphere at 180° C. for 5 minutes by means of a Banbury mixer. The kneadate was passed through a roll to obtain a sheet-like form which was then formed into square pellets by means of a sheet cutter.

Subsequently, 100 parts by weight of the square pellets, 0.3 part by weight of 1,3-bis(tert -butylperoxyisopropyl)benzene (peroxide (A)), 0.5 part by weight of divinylbenzene (DVB) and 0.5 part by weight of maleic anhydride (MAH) were mixed with stirring by means of a Henschel mixer. The mixture was then extruded in a nitrogen atmosphere at 220° C. by means of a single screw extruder of L/D=30 and a screw diameter of 50 mm to prepare a graft modified polyolefin elastomer (TPE-A of Example 1).

TPE-A thus prepared was extruded into a sheet-like form by means of a T-die extrusion molding machine having 90 mm$\phi$ manufactured by Toshiba Kikai K.K. under the conditions where screw is in full flight, L/D=22, extrusion temperature is 220° C., T-die is a coat hanger die, and take-up speed is 2.5 m/min. The extruded sheet-like TPE-A in a molten state was laminated with the polyamide sheet of Example 1 and passed through a pair of rolls, while allowing the TPE-A sheet to come in contact with one roll kept at 60° and the polyamide sheet to come in contact with the other roll kept at room temperature, to prepare a two-layer sheet comprising the modified polyolefin elastomer layer (TPE-A layer) of 0.7 mm thick and the polyamide layer of 50 $\mu$m thick.

TABLE 3

| | Example 21 | Example 22 | Example 23 | Example 24 | Example 25 | Compar. Example 21 | Compar. Example 22 | Compar. Example 23 |
|---|---|---|---|---|---|---|---|---|
| Process | 3 | 3 | 3 | 3 | 3 | 3 | 3 | 3 |
| Structure of laminated molded article | | | | | | | | |
| Surface skin | Polyamide | Polyamide | Polyester | Polyurethane | Polyamide | PVC | TPE-A | Polyamide |
| Interlayer (II) | TPE-A | TPE-B | TPE-C | TPE-D | TPE-E | | | TPE-F |
| Interlayer (I) | PP foam | PP foam | PP foam | PP foam | PP foam | PP foam | PP foam | PP foam |
| Core layer | TPE(1) | TPE(2) | PP(1) | PP(2) | TPE(1) | TPE(1) | TPE(1) | TPE(1) |
| Adhesion between layers | Failure | Failure | Failure | Failure | Failure | — | — | less than 0.5 |
| Peeling strength [kg/cm] *1 | Failure | Failure | Failure | Failure | Failure | less than 0.5 | Failure | Failure |
| Cross-cut adhesion test *1 | 100/100 | 100/100 | 100/100 | 100/100 | 100/100 | — | — | 0/100 |
| | 100/100 | 100/100 | 100/100 | 100/100 | 100/100 | 0/100 | 100/100 | 100/100 |
| Depth of grain pattern [$\mu$m] | 125 | 135 | 130 | 130 | 140 | 90 | 125 | 125 |
| Soft touch | 5 | 5 | 4 | 4 | 5 | 5 | 5 | 5 |
| Abrasion resistance [mg] | less than 1 | less than 1 | less than 1 | less than 1 | less than 1 | 20 | 30 | *2 |
| Flaw resistance | A | A | A | A | A | B | C | C |
| Oil resistance | A | A | A | A | A | A | C | C |
| Solvent resistance | A | A | A | A | A | A | C | C |
| Heat resistance [%] | 98 | 98 | 97 | 96 | 95 | 5 | 95 | 98 |
| Low-temp. resistance *3 | None | None | None | None | None | Found | None | None |

*1 The upper row shows adhesion between the surface skin and interlayer (II) or (I), and the lower row shows adhesion between the interlayer (I) and core layer.
*2 Measurement was inoperable owing to delamination of the polyamide layer.
*3 Existence of cracking or splitting is shown.

Embodiments of the Fourth Process of the Invention

EXAMPLE 31

(i) Preparation of two-layer sheet comprising a modified polyolefin elastomer layer and a polyamide layer A mixture comprising 80 parts by weight of an ethylene/propylene/5-ethylidene-2-norbornene copolymer rubber (EPDM (1)) containing 70 mol % of ethylene and having an iodine value of 12 and a Mooney viscosity $ML_{1+4}$(100° C.) of 120 and 20 parts by weight of polypropylene (PP) having MFR (ASTM D 1238-65T, 230° C.) of 13 g/10 min and a density of 91 g/cm³

(ii) Preparation of thermoplastic elastomer for core

A thermoplastic elastomer (TPE (1) of Example) having MFR of 3 g/10 min was obtained by repeating the same procedure as in (ii) of Example 1.

(iii) Preparation laminated molded article

A two-layer laminated molded article was obtained by repeating substantially the same procedure as (iii) of Example 1 under the same vacuum forming and injection molding conditions as those in (iii) of Example 1.

The three-layer laminated molded article thus obtained was evaluated in the same manner as in Example 1.

Results of evaluation obtained are shown in Table 4.

EXAMPLE 32

A three-layer laminated molded article was obtained by repeating Example 31 except that the two-layer sheet in (i) of Example 31 and the thermoplastic elastomer for core in (ii) of Example 31 were prepared, respectively, by the following manner. The three-layer laminated molded article obtained was evaluated in the same manner as in Example 31.

(i) Preparation of two-laye sheet

A graft modified polyolefin elastomer (TPE-B of Example 2) was prepared by repeating (i) of Example 31 except that 60 parts by weight of EPDM (1) and 40 parts by weight of PP were used and further 20 parts by weight of 11R and 40 parts by weight of the oil were used. Subsequently, from this TPE-B and the polyamide sheet of Example 2, a two-layer sheet comprising the modified polyolefin elastomer layer (TPE-B layer) of 0.7 mm thick and the polyamide layer of 50 μm thick was prepared in the same manner as in Example 31.

(ii) Preoaration of thermoolastic elastomer for core

A thermoplastic elastomer (TPE (2) of Example 2) was obtained by repeating (ii) of Example 2.

Results of evaluation obtained are shown in Table 4.

EXAMPLE 33

A three-layer laminated molded article was obtained by repeating Example 31 except that the two-layer sheet (i) of Example 31 was prepared in the following manner, and the polypropylene (PP (1) of Example 3) was used in place of TPE (1). The three-layer laminated molded article obtained was evaluated in the same manner as in Example 31.

(i) Preparation of two-layer sheet

A two-layer sheet comprising the modified polyolefin elastomer layer (TPE-C layer) of 0.7 mm thick and the polyester layer of 50 μm thick was prepared by repeating Example 31 except that in (i) of Example 31, the square pellets of unmodified polyolefin elastomer were prepared by using 80 parts by weight of EPDM (1) and 20 parts by weight of PP and further 10 parts by weight of 11R and 30 parts by weight of the oil, that the graft modified polyolefin elastomer (TPE-C of Example 3) was prepared by using glycidyl methacrylate in place of the maleic anhydride, and that the polyester sheet of Example 3 was used in place of the polyamide sheet.

Results of evaluation obtained are shown in Table 4.

EXAMPLE 34

A three-layer laminated molded article was obtained by repeating Example 31 except that the two-layer sheet in (i) of Example 31 was prepared in the following manner and that the polypropylene (PP (2)) of Example 4 was used in place of the TPE (1). The three-layer laminated molded article obtained was evaluated in the same manner as in Example 31.

(i) Preparation of two-layer sheet

A two-layer sheet comprising the modified polyolefin elastomer layer (TPE-D layer) of 0.7 mm thick and the thermoplastic polyurethane layer of 50 μm thick was prepared by repeating Example 31 except that in (i) of Example 31, the graft modified polyolefin elastomer (TPE-D of Example 4) was prepared by using hydroxypropyl methacrylate in place of the maleic anhydride, and the polyurethane sheet in (i) of Example 4 was used in place of the polyamide sheet. The two-layer laminated molded article obtained was evaluated in the same manner as in Example 31.

Results of evaluation obtained are shown in Table 4.

EXAMPLE 35

A three-layer laminated molded article was obtained by repeating Example 31 except that a dry blend of 80 parts by weight of the graft modified polyolefin elastomer (TPE-A) and 20 parts by weight of low density polyethylene (density 0.917 g/cm$^3$, melt index 6.5 (190° C.)) was fed to the T-die extrusion molding machine in (i) of Example 31, said laminated molded article comprising the modified polyolefin elastomer layer (TPE-E layer) of 0.7 mm thick and the polyamide layer of 50 μm thick. The three-layer molded article obtained was evaluated in the same manner as in Example 31.

Results of evaluation obtained are shown in Table 4.

COMPARATIVE EXAMPLE 31

A two-layer laminated molded article was obtained by repeating Example 31 except that the soft polyvinyl chloride sheet (0.75 mm thick) of Comparative Example 1 was used in place of the two-layer sheet. The two-layer laminated molded article obtained was evaluated in the same manner as in Example 31.

Results of evaluation obtained are shown in Table 4.

COMPARATIVE EXAMPLE 32

A two-layer laminated molded article was obtained by repeating Example 31 except that a TPE-A single layer sheet not laminated with the polyamide sheet was used in place of the two-layer sheet. The two-layer laminated molded article obtained was evaluated in the same manner as in Example 31.

Results of evaluation obtained are shown in Table 4.

COMPARATIVE EXAMPLE 33

A three-layer laminated molded article was obtained by repeating Example 31 except that in (i) of Example 31, no graft modification was carried out, and a two-layer sheet comprising an unmodified polyolefin elastomer layer (TPE-F layer) of 0.7 mm thick and the polyamide layer of 50 μm thick was prepared. The three-layer laminated molded article obtained was evaluated in the same manner as in Example 31.

Results of evaluation obtained are shown in Table 4.

TABLE 4

| | Example 31 | Example 32 | Example 33 | Example 34 | Example 35 | Compar. Example 31 | Compar. Example 32 | Compar. Example 33 |
|---|---|---|---|---|---|---|---|---|
| Process | 4 | 4 | 4 | 4 | 4 | 4 | 4 | 4 |
| Structure of laminated molded article | | | | | | | | |
| Surface skin | Polyamide | Polyamide | Polyester | Polyurethane | Polyamide | PVC | TPE-A | Polyamide |

TABLE 4-continued

|  | Example 31 | Example 32 | Example 33 | Example 34 | Example 35 | Compar. Example 31 | Compar. Example 32 | Compar. Example 33 |
|---|---|---|---|---|---|---|---|---|
| Interlayer (II) | TPE-A | TPE-B | TPE-C | TPE-D | TPE-E |  |  | TPE-F |
| Core layer | TPE(1) | TPE(2) | PP(1) | PP(2) | TPE(1) | TPE(1) | TPE(1) | TPE(1) |
| Adhesion between layers | Failure | Failure | Failure | Failure | Failure | — | — | less than 0.5 |
| Peeling strength [kg/cm] *1 | Failure | Failure | Failure | Failure | Failure | less than 0.5 | Failure | Failure |
| Cross-cut adhesion test *1 | 100/100 | 100/100 | 100/100 | 100/100 | 100/100 | — | — | 0/100 |
|  | 100/100 | 100/100 | 100/100 | 100/100 | 100/100 | 0/100 | 100/100 | 100/100 |
| Depth of grain pattern [μm] | 125 | 135 | 130 | 130 | 140 | 90 | 125 | 125 |
| Soft touch | 5 | 5 | 4 | 4 | 5 | 5 | 5 | 5 |
| Abrasion resistance [mg] | less than 1 | less than 1 | less than 1 | less than 1 | less than 1 | 20 | 30 | *2 |
| Flaw resistance | A | A | A | A | A | B | C | C |
| Oil resistance | A | A | A | A | A | A | C | C |
| Solvent resistance | A | A | A | A | A | A | C | C |
| Heat resistance [%] | 95 | 96 | 97 | 95 | 97 | 10 | 95 | 96 |
| Low-temp. resistance *3 | None | None | None | None | None | Found | None | None |

*1 The upper row shows adhesion between the surface skin and interlayer (II) or (I), and the lower row shows adhesion between the interlayer (I) and core layer.
*2 Measurement was inoperable owing to delamination of the polyamide layer.
*3 Existence of cracking or splitting is shown.

Embodiments of the Fifth Process of the Invention

EXAMPLE 41

A three-layer laminated molded article was obtained by repeating Example 31 except that preparation of the laminated molded article in (iii) was carried out in the following manner, and the three-layer laminated molded article obtained was evaluated.

(iii) Preparation of a laminated molded article

The two-layer sheet of Example 31 was preheated and applied by vacuum forming closely to the inner wall surface of cavity of a pair of molds so that the polyamide layer is positioned to the side of a female mold provided on its inner wall surface with a grain pattern of a depth of 150 μm, followed by draw forming. Thereafter, the thermoplastic erastomer [TPE (1)] for core in a molten state was placed uniformly on the two-layer sheet, and the male mold was closed. At the time when TPE (1) was integrated with the above-mentioned two-layer sheet, the molds were opened to obtain a three-layer laminated molded article.

The conditions under which the above-mentioned vacuum molding was carried out were similar to those of Example 31.

The conditions under which the above-mentioned-stamping was carried out are as follows:
Molding machine : ISM-300 manufactured by Ikegai
Screw diameter : 50 mmφ
Resin temperature : 230° C.
Pressing pressure : 200 kg/cm²
Molding cycle : 50 sec/1 cycle
Molded article :
   500 mm in length,
   500 mm in width and
   3 in thickness
Results of evaluation obtained are shown in Table 5.

EXAMPLE 42

A three-layer laminated molded article was obtained by repeating Example 41 except that the two-layer sheet and TPE (2) of Example 32 were used in place of the two-layer sheet (two-layer sheet of Example 31) and TPE (1), and the three-layer laminated molded article obtained was evaluated. Results of evaluation obtained are shown in Table 5.

EXAMPLE 43

A three-layer laminated molded article was obtained by repeating Example 41 except that the two-layer sheet of Example 33 and polypropylene (hereinafter called PP (3) for short) having a melt index (ASTM D 1238-65 T, 230° C.) of 3 a density of 0.91 g/cm³ were used in place of the two-layer sheet (two-layer sheet of Example 31) and TPE (1), and the three-layer laminated article obtained was evaluated.

Results of evaluation obtained are shown in Table 5.

EXAMPLE 44

A three-layer laminated molded article was obtained by repeating Example 41 except that the two-layer sheet of Example 34 and polypropylene (hereinafter called PP (4) for short) having MFR of 0.7 g/10 min. and containing 15 % of finely divided talc and 15% of short glass fiber were used in place of the two-layer sheet (two-layer sheet of Example 31) and TPE (1), and the three-layer laminated molded article was evaluated.

Results of evaluation are shown in Table 5.

EXAMPLE 45

A three-layer laminated molded article was obtained by repeating Example 41 except that the two-layer sheet of Example 35 and the PP (4) of Example 44 were used in place of the two-layer sheet (two-layer sheet of Example 31) and TPE (1), and the three-layer laminated molded article was evaluated.

Results of evaluation obtained are shown in Table 5.

COMPARATIVE EXAMPLE 41

A two-layer laminated molded article was obtained by repeating Example 41 except that a flexible polyvinyl chloride sheet of 0.75 mm thick of Comparative Example 31 was used in place of the two-layer sheet, and the two-layer laminated molded article was evaluated.

Results of evaluation are shown in Table 5.

COMPARATIVE EXMAPLE 42

A two-layer laminated molded article was obtained by repeating Example 41 except that a single-layer sheet of TPE-A without a laminated polyamide sheet was used in place of the two-layer sheet, and the two-layer laminated molded article was evaluated.

Results of evaluation are shown in Table 5.

COMPARATIVE EXMAPLE 43

A three-layer laminated molded article was obtained by repeating Example 41 except that the two-layer sheet of Comparative Example 33 was used in place of the two-layer sheet (two-layer sheet of Example 31), and the three-layer sheet obtained was evaluated.

Results of evaluation are shown in Table 5.

skin)] and TPE-A [interlayer (II)], adhesion between the polypropylene layer [interlayer (I)] and TPE (1) layer (core layer), depth of grain pattern, soft touch, abrasion resistance, flaw resistance, oil resistance, solvent resistance, heat resistance and low-temperature resistance were evaluated according to the aforementioned method of evaluation.

Results obtained are shown in Table 6.

TABLE 5

|  | Example 41 | Example 42 | Example 43 | Example 44 | Example 45 | Compar. Example 41 | Compar. Example 42 | Compar. Example 43 |
|---|---|---|---|---|---|---|---|---|
| Process | 5 | 5 | 5 | 5 | 5 | 5 | 5 | 5 |
| Structure of laminated molded article |  |  |  |  |  |  |  |  |
| Surface skin | Polyamide | Polyamide | Polyester | Polyurethane | Polyamide | PVC | TPE-A | Polyamide |
| Interlayer (II) | TPE-A | TPE-B | TPE-C | TPE-D | TPE-E |  |  | TPE-F |
| Core layer | TPE(1) | TPE(2) | PP(3) | PP(4) | PP(4) | TPE(1) | TPE(1) | TPE(1) |
| Adhesion between layers | Failure | Failure | Failure | Failure | Failure | — | — | less than 0.5 |
| Peeling srength [kg/cm] |  |  |  |  |  |  |  |  |
| *1 | Failure | Failure | Failure | Failure | Failure | less than 0.5 | Failure | Failure |
| Cross-cut adhesion test | 100/100 | 100/100 | 100/100 | 100/100 | 100/100 | — | — | 0/100 |
| *1 | 100/100 | 100/100 | 100/100 | 100/100 | 100/100 | 0/100 | 100/100 | 100/100 |
| Depth of grain pattern [μm] | 130 | 140 | 135 | 135 | 145 | 80 | 130 | 130 |
| Soft touch | 5 | 5 | 4 | 4 | 4 | 5 | 5 | 5 |
| Abrasion resistance [mg] | less than 1 | less than 1 | less than 1 | less than 1 | less than 1 | 21 | 33 | *2 |
| Flaw resistance | A | A | A | A | A | B | C | C |
| Oil resistance | A | A | A | A | A | A | C | C |
| Solvent resistance | A | A | A | A | A | A | C | C |
| Heat resistance [%] | 95 | 96 | 97 | 97 | 96 | 8 | 95 | 96 |
| Low-temp. resistance *3 | None | None | None | None | None | Found | None | None |

*1 The upper row shows adhesion between the surface skin and interlayer (II), and the lower row shows adhesion between the interlayer (II) or surface skin and core layer.
*2 Measurement was inoperable owing to delamination of the polyamide layer.
*3 Existence of cracking or splitting is shown.

EXAMPLE 51

TPE-A and TPE (1) of Example 31 were extruded through T-die extrusion molding machine of 90 mm in diameter (manufactured by Toshiba Kikai K.K.) into a sheet-like form under the conditions where the screw is full flight, L/D=22, extrusion temperature is 220° C., T-die is a coat hanger die and take-off speed is 2.5 m/min. The resultant sheet-like material having the laminated structure (polyamide sheet/TPE-A/TPE (1)) of Example 31 was passed through a pair of rolls, while allowing the TPE (1) sheet to come in contact with a roll kept at a roll temperature of 60° C. and the polyamide sheet to come in contact with a roll of room temperature, whereby a three-layer sheet was prepared, in which the thermoplastic elastomer layer (TPE (1) layer) has a thickness of 2 mm, the modified polyolefin elastomer layer (TPE-A layer) has a thickness of 0.7 mm and an polyamide layer has a thickness of 50 μm.

Preparation of a laminated molded article

The above-mentioned three-layer sheet was preheated and applied by vacuum forming closely to the inner wall surface of cavity of a pair of molds so that the polyamide layer is positioned to the side of a female mold provided on its inner wall surface with a grain pattern of a depth of 150 μm, followed by draw forming. Thereafter, the molds were opened to obtain a four-layer laminated article.

The conditions under which the above-mentioned vacuum molding was carried out are as follows:
Heater temperature : 360° C.
Preheating time : 100 seconds
Vacuum pressure : 700 mmHg In the thus obtained four-layer laminated molded article, adhesion between the polyamide layer [(surface skin)] and TPE-A [interlayer (II)], adhesion between

EXAMPLE 52

A three-layer laminated molded article was obtained by repeating Example 51 except that TPE-B, the polyamide sheet and TPE (2) of Example 32 were used in place of TPE-A, the polyamide sheet (polyamide sheet of Example 31) and TPE (1), and the three-layer laminated molded article was evaluated.

Results of evaluation are shown in Table 6.

EXAMPLE 53

A three-layer laminated molded article was obtained by repeating Example 51 except that TPE-C, a polyester sheet and PP (1) of Example 33 were used in place of TPE-A, the polyamide sheet (polyamide sheet of Example 31) and TPE (1), and the three-layer laminated molded article was evaluated.

Results of evaluation are shown in Table 6.

EXAMPLE 54

A three-layer laminated molded article was obtained by repeating Example 51 except that TPE-D, a polyurethane sheet and PP (2) of Example 34 were used in place of TPE-A, the polyamide sheet (polyamide sheet of Example 31) and TPE (1), and the three-layer laminated molded article was evaluated.

Results of evaluation obtained are shown in Table 6.

EXAMPLE 55

A three-layer laminated molded article was obtained by repeating Example 51 except that TPE-E of Example 35 was used in place of TPE-A, and the three-layer laminated molded article was evaluated.

Results of evaluation obtained are shown in Table 6.

COMPARATIVE EXMAPLE 51

A two-layer laminated molded article was obtained by repeating Example 51 except that a soft polyvinyl chloride of Comparative Example 31 was used in place of the polyamide sheet and that TPE-A was not used, and the two-layer laminated molded article obtained was evaluated.

Results of evaluation obtained are shown in Table 6.

COMPARATIVE EXAMPLE 52

A two-layer laminated molded article was obtained by repeating Example 51 except that TPE-A of Example 31 was used in place of the polyamide sheet and that TPE-A as the intermediate layer (II) was not used, and the two-layer laminated molded article obtained was evaluated.

Results of evaluation obtained are shown in Table 6.

COMPARATIVE EXMAPLE 53

A three-layer laminated molded article was obtained by repeating Example 51 except that TPE-F of Comparative Example 33 was used in place of TPE-A, and the three-layer laminated molded article obtained was evaluated.

Results of evaluation obtained are shown in Table 6.

065) and 30 parts by weight of a naphthene process oil was kneaded by means of a Banbury mixer in a nitrogen atmosphere at 180° C. for 5 minutes, and square pellets were obtained from the resultant kneadate by using a sheet cutter.

Subsequently, 100 parts by weight of the square pellets and 1 part by weight of a mixture composed of 20% by weight of 1,3-bis(tert-butylperoxyisopropyl)benzene, 30% by weight of DVB and 50 % by weight of paraffin mineral oil were mixed by means of a Henschel mixer. The pellets thus kneaded were extruded through an extruder in a nitrogen atmosphere at 220° C. to obtain pellets of a thermoplastic elastomer [TPE (3)].

As TPE (1), material similar to that used in Example 1 was used.

Preparation of a four-layer laminated sheet

At first, 100 parts by weight of TPE (3), 20 parts by weight of azodicarbonamide (ADCA) as a foaming agent and 0.1 part by weight of triallyl isocyanurate (TAIC) were mixed by means of a Henschel mixer. The mixture was extruded through a T-die extrusion molding machine of 90 mm in diameter (manufactured by Toshiba K.K.) into an unexpanded sheet of 0.5 mm thick under the conditions where the screw is full flight, L/D=22, extrusion temperature is 180° C. and take-off speed is 5 m/min.

TABLE 6

| | Example 51 | Example 52 | Example 53 | Example 54 | Example 55 | Compar. Example 51 | Compar. Example 52 | Compar. Example 53 |
|---|---|---|---|---|---|---|---|---|
| Process | 6 | 6 | 6 | 6 | 6 | 6 | 6 | 6 |
| Structure of laminated molded article | | | | | | | | |
| Surface skin | Polyamide | Polyamide | Polyester | Polyurethane | Polyamide | PVC | TPE-A | Polyamide |
| Interlayer (II) | TPE-A | TPE-B | TPE-C | TPE-D | TPE-E | | | TPE-F |
| Core layer | TPE(1) | TPE(2) | PP(3) | PP(4) | PP(4) | TPE(1) | TPE(1) | TPE(1) |
| Adhesion between layers | Failure | Failure | Failure | Failure | Failure | — | — | less than 0.5 |
| Peeling strength [kg/cm] *1 | Failure | Failure | Failure | Failure | Failure | less than 0.5 | Failure | Failure |
| Cross-cut adhesion test | 100/100 | 100/100 | 100/100 | 100/100 | 100/100 | — | — | 0/100 |
| *1 | 100/100 | 100/100 | 100/100 | 100/100 | 100/100 | 0/100 | 100/100 | 100/100 |
| Depth of grain pattern [μm] | 130 | 140 | 135 | 135 | 145 | 80 | 130 | 130 |
| Soft touch | 5 | 5 | 4 | 4 | 4 | 5 | 5 | 5 |
| Abrasion resistance [mg] | less than 1 | less than 1 | less than 1 | less than 1 | less than 1 | 21 | 33 | *2 |
| Flaw resistance | A | A | A | A | A | B | C | C |
| Oil resistance | A | A | A | A | A | A | C | C |
| Solvent resistance | A | A | A | A | A | A | C | C |
| Heat resistance [%] | 95 | 96 | 95 | 96 | 97 | 8 | 95 | 96 |
| Low-temp. resistance *3 | None | None | None | None | None | Found | None | None |

*1 The upper row shows adhesion between the surface skin and interlayer (II), and the lower row shows adhesion between the interlayer (II) or surface skin and core layer.
*2 Measurement was inoperable owing to delamination of the polyamide layer.
*3 Existence of cracking or splitting is shown.

Embodiments of the First Process of the Invention

EXAMPLE 56

Preparation of TPE-A pellets for the interlayer (II), TPE (3) pellets for the interlayer (I) and TPE (1) pellets for the core layer As TPE-A, material similar to that used in Example 1 was used.

TPE(3)

A mixture comprising 25 parts by weight of isotactic polypropylene resin [melt flow rate 13 g/10 min. (230° C.)], 75 parts by weight of ethylene/propylene/ethylidenenorbornene ternary copolymer rubber [ethylene unit/propylene unit (mole ratio) of 78/22, iodine value of 1 15, Mooney viscosity $ML_{1+4}$ (121° C.) of 61], 25 parts by weight of butyl rubber (sold by ESSO, 11R Subsequently, TPE-A and polyamide resin (nylon 12 produced by Daicel Hules Co., L2140) were fed to the extrusion machine of 90 mm in diameter and the extrusion machine of 40 mm in diameter, respectively in a cross head type two-layer T-die extrusion machine of 90 mm and 40 mm in diameter (manufactured by Toshiba K.K.), and extruded into a two-layer sheet-like form under the conditions where the extrusion temperature is 220° C. and take-off speed is 2.5 m/min. An unexpanded sheet of TPE (3) was laminated on TPE-A in a molten state of the extruded two-layer sheet and passed through a pair of rolls, whereby a three-layer sheet was prepared, in which the polyamide layer has a thickness of 30 μm, TPE-A has a thickness of 0.7 mm and TPE (3) has a thickness of 0.5 mm.

Subsequently, TPE (1) was extruded through the T-die extrusion machine of 90 mm in diameter (manufactured by Toshiba K.K.) into a sheet-like form under the conditions where the extrusion temperature is 220° C. and take-off speed is 2.5 m/min. Extruded sheet-like TPE (1) in a molten state was allowed to come in contact with the unexpanded layer of TPE (3) in the three-layer sheet prepared above and both TPE (1) and the three-layer sheet were passed through a pair of rolls, whereby a four-layer sheet was prepared, in which the polyamide layer has a thickness of 30 μm, TPE-A has a thickness of 0.7 mm, TPE (3) has a thickness of 0.5 mm and TPE (1) has a thickness of 3 mm.

Expanding an unexpanded sheet layer

The above-mentioned four-layer sheet was left in an air oven kept at 240° C. for 4 minutes, and the TPE (3) unexpanded sheet was expanded. In the thus obtained four-layer sheet, the polyamide layer has a thickness of 30 μm, TPE-A layer has a thickness of 0.7 mm, TPE (3) layer has a thickness of 1.0 mm and TPE (1) layer has a thickness of 3 mm.

Preparation of a laminated molded article

The above-mentioned four-layer sheet was preheated and applied by vacuum forming closely to the inner wall surface of cavity of a pair of molds so that the polyamide layer is positioned to the side of a female mold provided on its inner wall surface with a grain pattern of a depth of 150 μm, followed by draw forming. Thereafter, the molds were opened to obtain a four-layer laminated molded article.

The conditions under which the above-mentioned vacuum molding was carried out are as follows:
Heater temperature : 360° C.
Preheating time : 100 seconds
Vacuum pressure : 700 mmHg In the thus obtained four-layer laminated molded article, adhesion between the polyamide layer [(surface skin)] and TPE-A layer [interlayer (II)], adhesion between foam TPE (3) layer [interlayer (I)] and TPE (1) layer (core layer), depth of grain pattern, soft touch, abrasion resistance, flaw resistance, oil resistance, solvent resistance, heat resistance, and low-temperature resistance were evaluated according to the aforementioned method of evaluation.

Results of evaluation obtained are shown in Table 7.

EXAMPLE 57-60

A four-layer laminated molded article was obtained by repeating Example 56 except that the interlayer II, pellets for the core layer and surface skin layer as shown in Table 7 were used.

Additionally, TPE-B, TPE (2), TPE-C PP (1), polyester, TPE-D, PP (2), polyurethane and TPE-E described in Table 7 are the same as mentioned above.

EXAMPLE 61-62

A four-layer laminated molded article was obtained by repeating Example 56 except that the expanding agent was used in an amount as shown in Table 7.

EXAMPLE 63-64

A four-layer laminated molded article was obtained by repeating Example 56 except that a blend of TPE (3) shown in Table 7 and low density polyethylene (LLDPE) having density of 0.917 g/cm$^3$ and a mold index of 6.5 g/10 min (190° C.) was used as the interlayer (I) in place of TPE (3).

EXAMPLE 65

A four-layer laminated molded article was obtained by repeating Example 56 except that the unexpanded four-layer sheet was vacuum formed under the following conditions to be expanded and molded simultaneously:
Heater temperature : 380° C.
Preheating time : 180 seconds
Vacuum pressure : 700 mmHg

EXAMPLE 66

Preparation of a three-layer laminated sheet

Polyamide, TPE-A and TPE (3) were laminated by the same procedure as in Example 56.

Foaming on unfoamed sheet

The above-mentioned three-layer sheet was left in an air oven kept at 240° C. for 4 min., and an unexpanded sheet of TPE (3) was expanded to obtain a three-layer sheet comprising a polyamide layer having a thickness of 30 μm, TPE-A having a thickness of 0.7 mm and TPE (3) having a thickness of 1.0 mm.

Preparation of a laminated molded article

The above-mentioned three-layer sheet was preheated and applied by vacuum forming closely to the inner wall surface of cavity of a pair of molds so that the polyamide layer is positioned to the side of a female mold provided on its inner wall surface with a grain pattern of a depth of 150 μm, followed by draw forming. Thereafter, the female mold was closed, and the thermoplastic elastomer for core [(TPE (1)] was injected through a nozzle of injection molding machine into the cavity from the male mold side and solidified. At the time when TPE (1) was integrated with the above-mentioned three-layer sheet, the molds were opened to obtain a four-layer laminated molded article.

The conditions under which the above-mentioned vacuum molding was carried out are as follows:
Heater temperature : 360° C.
Preheating time : 45 seconds
Vacuum pressure : 700 mmHg The conditions under which the above-mentioned injection molding was carried out are as follows:
Molding machine : Dynamelter (manufactured by Meiki Seisakusho K.K.)
Molding temperature : 220° C.
Injection pressure :
    Primary pressure: 1000 Kg/cm$^2$
    Secondary pressure: 700/cm$^2$
Injection speed : Maximum
Molding cycle : 90 sec./1 cycle
Gate : Direct gate (land length 10 mm, width 10 mm and thickness 3 mm)

In the thus obtained four-layer laminated molded article, adhesion between the polyamide layer [(Surface skin)] and TPE-A layer [interlayer (II)], adhesion between TPE (3) layer [interlayer (I)] and TPE (1) layer (core layer), depth of grain pattern, soft touch, abrasion resistance, flaw resistance, oil resistance, solvent resistance, heat resistance and low temperature resistance were evaluated according to the aforementioned method of evaluation.

EXAMPLE 67

A four-layer laminated molded article was obtained by repeating Example 66 except that a laminated molded article was prepared as follows:

Preparation of a laminated molded article

The above-mentioned three-layer sheet was preheated and applied by vacuum forming closely to the inner wall surface of cavity of a pair of molds so that the polyamide layer is positioned to the side of a female mold provided on its inner wall surface with a grain pattern of a depth of 150 μm, followed by draw forming. Thereafter, a thermoplastic elastomer [TPE (1)] for core in a molten state was placed on the three-layer sheet uniformly, and the male mold was closed. At the time when TPE (1) was solidified and integrated with the above-mentioned three-layer sheet, the molds were opened to obtain a four-layer laminated molded article. The conditions under which the above-mentioned vacuum forming was carried out are the same as in Example 66. Furthermore, the conditions under which the above-mentioned stamp molding was carried out are as follows:

Molding machine : ISM-300 (manufactured by Ikegai K.K.)
Screw diameter : 50 mm
Resin temperature : 230° C.
Pressing pressure : 200 Kg/cm²
Molding cycle : 50 sec/1 cycle
Molded article : length 500 mm, width 500 mm, and thickness 3 mm

COMPARATIVE EXAMPLE 54

A four-layer laminated molded article was obtained by repeating Example 56 except that an expanding agent was not used.

TABLE 7

| | Example 56 | Example 57 | Example 58 | Example 59 | Example 60 | Example 61 | Example 62 |
|---|---|---|---|---|---|---|---|
| Process | 1 | 1 | 1 | 1 | 1 | 1 | 1 |
| Structure of laminated molded article Surface skin | Polyamide | Polyamide | Polyester | Polyurethane | Polyamide | Polyamide | Polyamide |
| Interlayer (II) | TPE-A | TPE-B | TPE-C | TPE-D | TPE-E | TPE-A | TPE-A |
| Interlayer (I) TPE3/LLDPE | 100/0 | 100/0 | 100/0 | 100/0 | 100/0 | 100/0 | 100/0 |
| Amount of foaming agent | 2 | 2 | 2 | 2 | 2 | 1.5 | 3 |
| Expansion ratio | 2 | 2 | 2 | 2 | 2 | 1.5 | 3 |
| Core layer | TPE(1) | TPE(2) | PP(1) | PP(2) | TPE(1) | TPE(1) | TPE(1) |
| Adhesion between layers Peeling strength (kg/cm) *1 | Failure Failure | Failure Failure | Failure Failure | Failure Failure | Failure Failure | Failure Failure | Failure Failure |
| Cross-cut adhesion test *1 | 100/100 100/100 | 100/100 100/100 | 100/100 100/100 | 100/100 100/100 | 100/100 100/100 | 100/100 100/100 | 100/100 100/100 |
| Depth of grain pattern (μm) | 125 | 130 | 128 | 130 | 140 | 128 | 135 |
| Soft touch | 5 | 5 | 4 | 4 | 5 | 4 | 5 |
| Abrasion resistance (mg) | less than 1 | less than 1 | less than 1 | less than 1 | less than 1 | less than 1 | less than 1 |
| Flaw resistance | A | A | A | A | A | A | A |
| Oil resistance | A | A | A | A | A | A | A |
| Solvent resistance | A | A | A | A | A | A | A |
| Heat resistance (%) | 98 | 96 | 95 | 95 | 97 | 98 | 97 |
| Low-temp. resistance *3 | None | None | None | None | None | None | None |

| | Example 63 | Example 64 | Example 65 | Example 66 | Example 67 | compar. Example 54 |
|---|---|---|---|---|---|---|
| Process | 1 | 1 | 2 | 3 | 3 | 1 |
| Structure of laminated molded article Surface skin | Polyamide | Polyamide | Polyamide | Polyamide | Polyamide | Polyamide |
| Interlayer (II) | TPE-A | TPE-A | TPE-A | TPE-A | TPE-A | TPE-A |
| Interlayer (I) TPE3/LLDPE | 90/10 | 80/20 | 100/0 | 100/0 | 100/0 | 100/0 |
| Amount of foaming agent | 2 | 2 | 2 | 2 | 2 | 0 |
| Expansion ratio | 2 | 2 | 2 | 2 | 2 | 0 |
| Core layer | TPE(1) | TPE(1) | TPE(1) | TPE(1) | TPE(1) | TPE(1) |
| Adhesion between layers Peeling strength (kg/cm) *1 | Failure Failure | Failure Failure | Failure Failure | Failure Failure | Failure Failure | Failure Failure |
| Cross-cut adhesion test *1 | 100/100 100/100 | 100/100 100/100 | 100/100 100/100 | 100/100 100/100 | 100/100 100/100 | 100/100 100/100 |
| Depth of grain pattern (μm) | 130 | 138 | 128 | 127 | 125 | 126 |
| Soft touch | 5 | 5 | 5 | 5 | 5 | 1 |
| Abrasion resistance (mg) | less than 1 | less than 1 | less than 1 | less than 1 | less than 1 | less than 1 |
| Flaw resistance | A | A | A | A | A | A |
| Oil resistance | A | A | A | A | A | A |
| Solvent resistance | A | A | A | A | A | A |
| Heat resistance (%) | 98 | 97 | 99 | 98 | 97 | 97 |
| Low-temp. resistance *3 | None | None | None | None | None | None |

*1 The upper row shows adhesion between the surface skin and interlayer (II) or (I), and the lower row shows adhesion between the interlayer (I) and core layer.
*3 Existence of cracking or splitting is shown.

EXAMPLE 68

Preparation of TPE-A pellets for the interlayer (II), TPE (3) pellets for the interlayer (I) and TPE (1) pallets for the core layer A four-layer laminated sheet was prepared as follows by using the above-mentioned TPE-A, TPE (3), TPE (1) and polyamide.

Preparation of four-layer laminated sheet

At first, 100 parts by weight of TPE (3), 2.0 parts by weight of azodicarbonamide (ADCA) as an expanding agent, and 0.1 part by weight of triallyl isocyanurate (TAIC) were mixed by means of a Henschel mixer. The mixture was extruded through a T-die extrusion molding machine of 90 mm in diameter (manufactured by Toshiba K.K.) into an unfoamed sheet of 0.5 mm thick under the conditions where the screw is full flight, L/D=22, extrusion temperature is 180° C. and take-off speed is 5 m/min.

Subsequently, TPE-A and polyamide resin (nylon 12 produced by Daicel Hules Co., L2140) were fed to the extrusion machine of 90 mm in diameter and the extrusion machine of 40 mm in diameter, respectively in a cross head type two-layer T-die extrusion machine of 90 mm and 40 mm in diameter (manufactured by Toshiba K.K.), and extruded into a two-layer sheet-like form under the conditions where the extrusion temperature is 220° C. and take-off speed is 2.5 m/min. An unexpanded sheet of TPE was laminated on TPE-A in a molten state of the extruded two-layer sheet and passed through a pair of rolls, whereby a three-layer sheet was prepared, in which the polyamide layer has a thickness of 30 μm, TPE-A layer has a thickness of 0.7 mm and TPE layer has a thickness of 0.5 mm.

Subsequently, TPE (1) was extruded through the T-die extrusion machine of 90 mm in diameter (manufactured by Toshiba K.K.) into a sheet-like form under the conditions where the extrusion temperature is 220° C. and take-off speed is 2.5 m/min. Extruded sheet-like TPE (1) in a molten state was allowed to come in contact with the unexpanded layer of TPE in the three-layer sheet prepared above and both TPE (1) and the three-layer sheet were passed through a pair of rolls, whereby a four-layer sheet was prepared, in which the polyamide layer has a thickness of 30 μm, TPE-A layer has a thickness of 0.7 mm and TPE layer has a thickness of 0.5 mm and TPE (1) layer has a thickness of 3 mm.

Expanding an unexpanded sheet layer

The above-mentioned four-layer sheet was left in an air oven kept at 240° C. for 4 minutes and the TPE unexpanded sheet was expanded. In the thus obtained four-layer sheet, the polyamide layer has a thickness of 30 μm, TPE-A layer has a thickness of 0.7 mm, TPE (3) layer has a thickness of 1.0 mm and TPE (1) layer has a thickness of 3 mm.

Preparation of a laminated molded article

The above-mentioned four-layer sheet was preheated and applied by vacuum forming closely to the inner wall surface of cavity of a pair of molds so that the polyamide layer is positioned to the side of a female mold, followed by forming. Thereafter, the molds were opened to obtain a four-layer laminated molded article.

The conditions under which the above-mentioned vacuum molding was carried out are as follows:
Heater temperature : 360° C.
Preheating time : 100 seconds
Vacuum pressure: 700 mmHg Subsequently, the polyamide layer surface of the thus obtained laminated molded article was buffed with an emery paper sheet (600 mesh) for five minutes.

In the four-layer laminated molded article, adhesion between the polyamide layer [(surface skin)] and TPE-A layer [interlayer (II)], hand feel, soft touch, abrasion resistance, flaw resistance, oil resistance, solvent resistance, heat resistance and low-temperature resistance were evaluated according to the aforementioned method of evaluation.

Results of evaluation obtained are shown in Table 8.

EXAMPLES 69-72

A four-layer laminated molded article was obtained by repeating Example 68 except that the core layer and surface skin layer as shown in Table 8 were used in place of the interlayer (II) and the interlayer (I).

Results of evaluation for the laminated and molded article are shown in Table 8.

EXAMPLE 73

A three-layer laminated molded article was obtained by repeating Example 68 except that TPE (3) for the interlayer (I) was not used.

Results of evaluation for the laminated and molded article are shown in Table 8.

EXAMPLE 74

A three-layer sheet was obtained by repeating Example 68 except that PP foam was used in place of TPE foam for the interlayer (I), and a four-layer laminated molded article was obtained by the following procedure.

The above-mentioned three-layer sheet was preheated and applied by vacuum forming closely to the inner wall surface of cavity of a pair of molds so that the polyamide layer is positioned to the side of a female mold, followed by closing the female mold. Thereafter, the thermoplastic elastomer for core [TPE (1)] was injected through a nozzle of injection molding machine into the cavity from the male mold side and solidified. At the time when TPE (1) was integrated with the above-mentioned three-layer sheet, the molds were opened to obtain a four-layer laminated article.

The conditions under which the above-mentioned vacuum molding was carried out are as follows:
Heater temperature : 360° C.
Preheating time : 45 seconds
Vacuum pressure : 700 mmHg The conditions under which the above-mentioned injection molding was carried out are as follows:
Molding machine : Dynamelter (manufactured by Meiki Seisakusho K.K.)
Molding temperature : 220° C.
Injection pressure :
  Primary pressure: 1000 kg/cm$^2$
  Secondary pressure: 700 kg/cm$^2$
Injection speed : Maximum
Molding cycle : 90 sec./1 cycle
Gate : Direct gate (land length 10 mm, width 10 mm and thickness 3 mm)

Results of evaluation for the laminated molded article are shown in Table 8.

EXAMPLE 75

A three-layer laminated molded article was obtained by repeating Example 74 except that PP foam for the intermediate layer (I) was not used.

Results of evaluation for the laminated molded article are shown in Table 8.

EXAMPLE 76

A three-layer sheet was obtained by repeating Example 74, and a procedure similar to that in Example 68 was carried out except that a four-layer laminated molded article was obtained by the following procedure.

The above-mentioned three-layer sheet was applied by vacuum forming closely to the inner wall surface of cavity of a pair of molds so that the polyamide layer is positioned to the side of a female mold. Thereafter,

EXAMPLE 77

A three-layer laminated molded article was obtained by repeating Example 76 except that PP foam for the interlayer (I) was not used.

Results of evaluation for the laminated molded article are shown in Table 8.

TABLE 8

| | Example | | | | | |
|---|---|---|---|---|---|---|
| | 68 | 69 | 70 | 71 | 72 | 73 |
| Process | 1 | 1 | 1 | 1 | 1 | 4 |
| Structure of laminat | | | | | | |
| Surface skin | Polyamide | Polyamide | Polyester | Polyurethane | Polyamide | Polyamide |
| Interlayer (II) | TPE-A | TPE-B | TPE-C | TPE-D | TPE-E | TPE-A |
| Interlayer (I) | TPE(3) foam | PP foam | PP foam | PP foam | PP foam | — |
| Core layer | TPE(1) | TPE(2) | PP(1) | PP(2) | TPE(1) | TPE(1) |
| Adhesion between layers | | | | | | |
| Peeling strength (kg/cm) | Failure | Failure | Failure | Failure | Failure | Failure |
| Cross-cut adhesion test | 100/100 | 100/100 | 100/100 | 100/100 | 100/100 | 100/100 |
| Quality of laminated molded article | | | | | | |
| Hand feel | good smooth feel | good smooth feel | good smooth feel | good smooth feel | good smooth feel | good smooth feel |
| Soft touch | 5 | 5 | 5 | 5 | 5 | 4 |
| Abrasion resistance (mg) | less than 1 | less than 1 | less than 1 | less than 1 | less than 1 | less than 1 |
| Flaw resistance | A | A | A | A | A | A |
| Oil resistance | A | A | A | A | A | A |
| Solvent resistance | A | A | A | A | A | A |
| Heat resistance (%) | 98 | 96 | 96 | 97 | 98 | 97 |
| Low-temp. resistance | None | None | None | None | None | None |

| | Example | | | |
|---|---|---|---|---|
| | 74 | 75 | 76 | 77 |
| Process | 2 | 5 | 3 | 6 |
| Structure of laminat | | | | |
| Surface skin | Polyamide | Polyamide | Polyamide | Polyamide |
| Interlayer (II) | TPE-A | TPE-A | TPE-A | TPE-A |
| Interlayer (I) | PP foam | — | PP foam | — |
| Core layer | TPE(1) | TPE(1) | TPE(1) | TPE(1) |
| Adhesion between layers | | | | |
| Peeling strength (kg/cm) | Failure | Failure | Failure | Failure |
| Cross-cut adhesion test | 100/100 | 100/100 | 100/100 | 100/100 |
| Quality of laminated molded article | | | | |
| Hand feel | good smooth feel | good smooth feel | good smooth feel | good smooth feel |
| Soft touch | 5 | 4 | 5 | 4 |
| Abrasion resistance (mg) | less than 1 | less than 1 | less than 1 | less than 1 |
| Flaw resistance | A | A | A | A |
| Oil resistance | A | A | A | A |
| Solvent resistance | A | A | A | A |
| Heat resistance (%) | 95 | 96 | 97 | 98 |
| Low-temp. resistance | None | None | None | None | thermoplastic elastomer for core [TPE (1)] in a molten state was placed on the three-layer sheet uniformly, and the male mold was closed. At the time when TPE (1) was solidified and integrated with the above-mentioned three-layer sheet, the molds were opened to obtain a four-layer laminated article.

The conditions under which the above-mentioned vacuum molding was carried out are the same as in Example 74.

The conditions under which stamp molding was carried out are as follows:
Molding machine : ISM-300 manufactured by Ikegai
Screw diameter : 50 mmϕ
Resin temperature : 230° C.
Pressing pressure : 200 kg/cm$^2$
Molding cycle : 50 sec/1 cycle
Molded article :
  500 mm in length,
  500 mm in width and
  3 mm in thickness

What is claimed is:

1. A laminated molded article comprising
   (a) a core layer composed of a synthetic resin,
   (b) an interlayer (I) composed of a polyolefin foam, polyurethane foam or thermoplastic elastomer foam, formed on said core layer,
   (c) an interlayer (II) composed of a modified polyolefin elastomer graft modified with at least one graft monomer selected from the group consisting of unsaturated carboxylic acids, derivatives thereof, unsaturated epoxy monomers and unsaturated hydroxy monomers, formed on said interlayer (I), and
   (d) a surface skin composed of at least one polymer selected from the group consisting of polyamides, polyurethanes and polyesters, formed on said interlayer (II).

2. A process for preparing the laminated molded article as claimed in claim 1, which process comprises the steps in sequence of obtaining a preform having a concavity by preheating a three-layer sheet comprising the interlayer (I) composed of the polyolefin foam, polyurethane foam or thermoplastic elastomer foam, the interlayer (II) composed of the modified polyolefin elastomer and the surface skin composed of the polymer, and then applying the three-layer sheet by attraction closely to an inner wall surface of cavity of a vacuum forming mold, obtaining a molded article having a concavity by clamping said preform in a state of being applied closely to the inner wall surface of cavity of said vacuum forming mold or in a state where said preform is applied closely to an inner wall surface of cavity of a separate vacuum forming mold, and injection molding a synthetic resin in a fluid plasticized state into the concavity of the molded article being applied closely to the inner wall surface of cavity of said mold.

3. A process for preparing the laminated molded article as claimed in claim 1, which process comprises the steps in sequence of obtaining a preform having a concavity by preheating a three-layer sheet comprising the interlayer (I) composed of the polyolefin foam, polyurethane foam or thermoplastic elastomer foam, the interlayer (II) composed of the modified polyolefin elastomer and the surface skin composed of the polymer, and then applying the three-layer sheet by attraction closely to an inner wall surface of cavity of a vacuum forming mold, and stamp molding after casting a synthetic resin into the concavity of the preform in a state of being applied closely to the inner wall surface of cavity of the vacuum molding mold or in a state where said preform is applied closely to an inner wall surface of cavity of a separate vacuum molding mold.

4. A process for preparing the laminated molded article as claimed in claim 1, which process comprises preheating a four-layer sheet comprising the core layer composed of the synthetic resin, the interlayer (I) composed of the polyolefin foam, polyurethane foam or thermoplastic elastomer foam, the interlayer (II) composed of the modified polyolefin elastomer and the surface skin composed of the polymer, followed by vacuum forming said four-layer sheet.

5. A laminated molded article comprising
(a) a core layer composed of a synthetic resin,
(b) an interlayer (II) composed of a modified polyolefin elastomer graft modified with at least one graft monomer selected from the group consisting of unsaturated carboxylic acids derivatives thereof, unsaturated epoxy monomers and unsaturated hydroxy monomers, formed on said core layer, and
(c) a surface skin composed of at least one polymer selected from the group consisting of polyamides, polyurethanes and polyesters, formed on said interlayer (II).

6. A process for preparing the laminated molded article as claimed in claim 5, which process comprises the steps in sequence of obtaining a preform having a concavity by preheating a two-layer sheet qomprising the interlayer (II) composed of the modified polyolefin elastomer and the surface skin composed of the polymer, and then applying the two-layer sheet by attraction closely to an inner wall surface of cavity of a vacuum molding mold, obtaining a molded article having a concavity by clamping said preform in a state of being applied closely to an inner wall surface of cavity of the vacuum molding mold or in a state where said preform is applied closely to an inner wall surface of cavity of a separate vacuum forming mold, and of molding after injecting a synthetic resin in a fluid plasticized state into the concavity of said molded article applied closely to the inner wall surface of cavity of said mold.

7. A process for preparing the laminated molded article as claimed in claim 5, which process comprises the steps in sequence of obtaining a preform having a concavity by preheating a two-layer sheet comprising the interlayer (II) composed of the modified polyolefin elastomer and the surface skin composed of the polymer, and then applying said two layer-sheet by attraction closely to an inner wall surface of cavity of a vacuum forming mold, and stamp molding after casing a synthetic resin in a fluid plasticized state into the concavity of said preform being applied closely to the inner wall surface of cavity of the vacuum forming mold or into the concavity of said preform being applied closely to an inner wall surface of cavity of a separate vacuum forming mold.

8. A process for preparing the laminated molded article as claimed in claim 5, which process comprises preheating a three-layer sheet comprising the core layer composed of the synthetic resin, the interlayer (II) composed of the modified polyolefin elastomer and the surface skin composed of the polymer, followed by vacuum forming said three-layer sheet.

9. A laminated molded article claimed in claim 1, wherein the thermoplastic elastomer forming said thermoplastic elastomer foam comprises as essential components a polyolefin resin and an ethylene/α-olefin copolymer rubber.

10. A laminated molded article comprising
(a) a core layer composed of a synthetic resin,
(b) an interlayer (II) composed of a modified polyolefin elastomer graft modified with at least one graft monomer selected from the group consisting of unsaturated carboxylic acids, derivatives thereof, unsaturated epoxy monomers and unsaturated hydroxy monomers, formed on said core layer, and
(c) a surface skin decorated on the surface thereof by gigging and composed of at least one polymer selected from the group consisting of polyamides, polyurethanes and polyesters, formed on said interlayer (II).

11. A laminated molded article comprising
(a) a core layer composed of a synthetic resin,
(b) an interlayer (I) composed of a polyolefin foam, polyurethane foam or thermoplastic elastomer foam, formed on said core layer,
(c) an interlayer (II) composed of a modified polyolefin elastomer graft modified with at least one graft monomer selected from the group consisting of unsaturated carboxylic acids, derivatives thereof, unsaturated epoxy monomers and unsaturated hydroxy monomers, formed on said interlayer (I), and
(d) a surface skin decorated on the surface thereof by gigging and composed of at least one polymer selected from the group consisting of polyamides, polyurethanes and polyesters, formed on said interlayer (II).

* * * * *